United States Patent
Hamano et al.

(10) Patent No.: US 12,464,237 B2
(45) Date of Patent: Nov. 4, 2025

(54) INFERENCE APPARATUS, IMAGE CAPTURING APPARATUS, TRAINING APPARATUS, INFERENCE METHOD, TRAINING METHOD, AND STORAGE MEDIUM

(71) Applicant: CANON KABUSHIKI KAISHA, Tokyo (JP)

(72) Inventors: Hideyuki Hamano, Kanagawa (JP); Akihiko Kanda, Kanagawa (JP); Kuniaki Sugitani, Kanagawa (JP); Yohei Matsui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 18/442,261

(22) Filed: Feb. 15, 2024

(65) Prior Publication Data

US 2024/0284047 A1 Aug. 22, 2024

(30) Foreign Application Priority Data

Feb. 20, 2023 (JP) ................. 2023-024624

(51) Int. Cl.
*H04N 23/67* (2023.01)
*G06T 7/50* (2017.01)
(Continued)

(52) U.S. Cl.
CPC ............. *H04N 23/675* (2023.01); *G06T 7/50* (2017.01); *H04N 23/61* (2023.01);
(Continued)

(58) Field of Classification Search
CPC .... H04N 23/635; H04N 23/61; H04N 23/617; H04N 23/675; H04N 23/672; G06T 7/50;
(Continued)

(56) References Cited

U.S. PATENT DOCUMENTS

| 10,666,851 B2 * | 5/2020 | Kikuchi | G03B 13/36 |
| 11,094,075 B1 * | 8/2021 | Lanman | G06N 3/045 |

(Continued)

FOREIGN PATENT DOCUMENTS

| JP | H03167536 A | 7/1991 |
| JP | 2022137760 A | 9/2022 |

OTHER PUBLICATIONS

European Search Report issued on Jul. 8, 2024, that issued in the corresponding European Patent Application No. 24157792.3.

*Primary Examiner* — Pritham D Prabhakher
(74) *Attorney, Agent, or Firm* — Cowan, Liebowitz & Latman, P.C.

(57) ABSTRACT

There is provided an inference apparatus. An inference unit performs inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject. The machine learning model is a model that has been trained to suppress a contribution made to the inference result by one or more distance information pieces that are not based on the subject among the plurality of distance information pieces.

21 Claims, 16 Drawing Sheets

(51) Int. Cl.
*H04N 23/61* (2023.01)
*H04N 23/63* (2023.01)
(52) U.S. Cl.
CPC . *H04N 23/635* (2023.01); *G06T 2207/20081* (2013.01); *G06T 2207/20084* (2013.01); *G06T 2207/30196* (2013.01); *H04N 23/672* (2023.01)
(58) Field of Classification Search
CPC . G06T 2207/20081; G06T 2207/30196; G06T 2207/20084
USPC .................................................. 348/222.1
See application file for complete search history.

(56) References Cited

U.S. PATENT DOCUMENTS

| | | | | |
|---|---|---|---|---|
| 11,468,687 B2* | 10/2022 | Takami | ............... | G06V 10/774 |
| 11,627,245 B2* | 4/2023 | Hoshino | ............. | H04N 23/675 |
| | | | | 348/345 |
| 11,758,269 B2* | 9/2023 | Tsuji | .................... | H04N 23/672 |
| | | | | 348/345 |
| 11,900,651 B2* | 2/2024 | Yoneyama | ............. | G06T 7/248 |
| 12,327,368 B2* | 6/2025 | Komatsu | ................ | G03B 15/00 |
| 2009/0146046 A1* | 6/2009 | Katsuda | ............. | H04N 23/672 |
| | | | | 250/201.6 |
| 2018/0213149 A1* | 7/2018 | Ohtsubo | ............. | H04N 23/672 |
| 2019/0296063 A1* | 9/2019 | Ichimiya | ............... | H04N 23/67 |
| 2019/0387175 A1 | 12/2019 | Kikuchi | | |
| 2021/0182577 A1* | 6/2021 | Takami | ................. | G06V 20/64 |
| 2021/0303846 A1* | 9/2021 | Yoneyama | ............. | G06T 7/248 |
| 2022/0094840 A1* | 3/2022 | Hongu | ................ | H04N 23/635 |
| 2022/0264022 A1* | 8/2022 | Tsuji | .................... | H04N 23/617 |
| 2022/0294991 A1 | 9/2022 | Hoshino | | |
| 2022/0392096 A1 | 12/2022 | Komatsu | | |

\* cited by examiner

PLAN VIEW a-a CROSS-SECTIONAL DIAGRAM

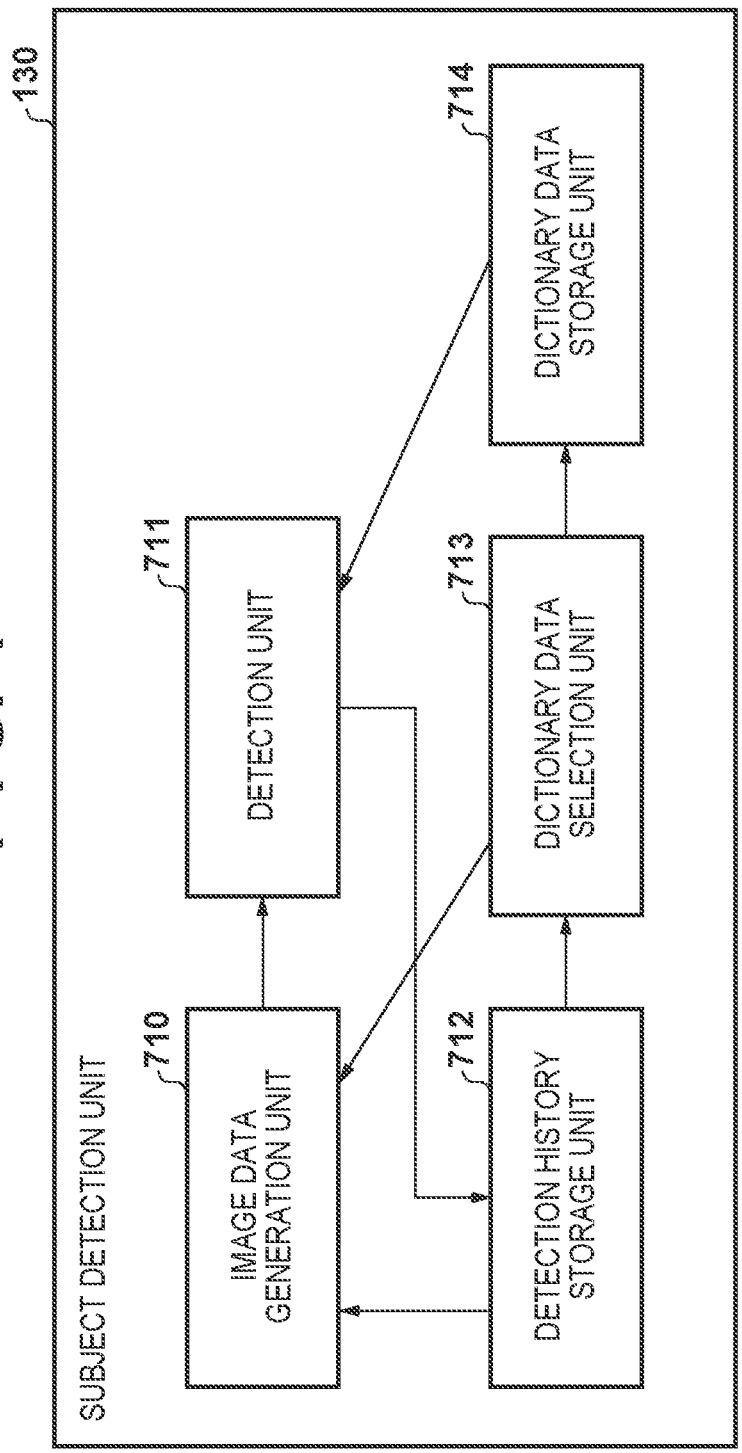

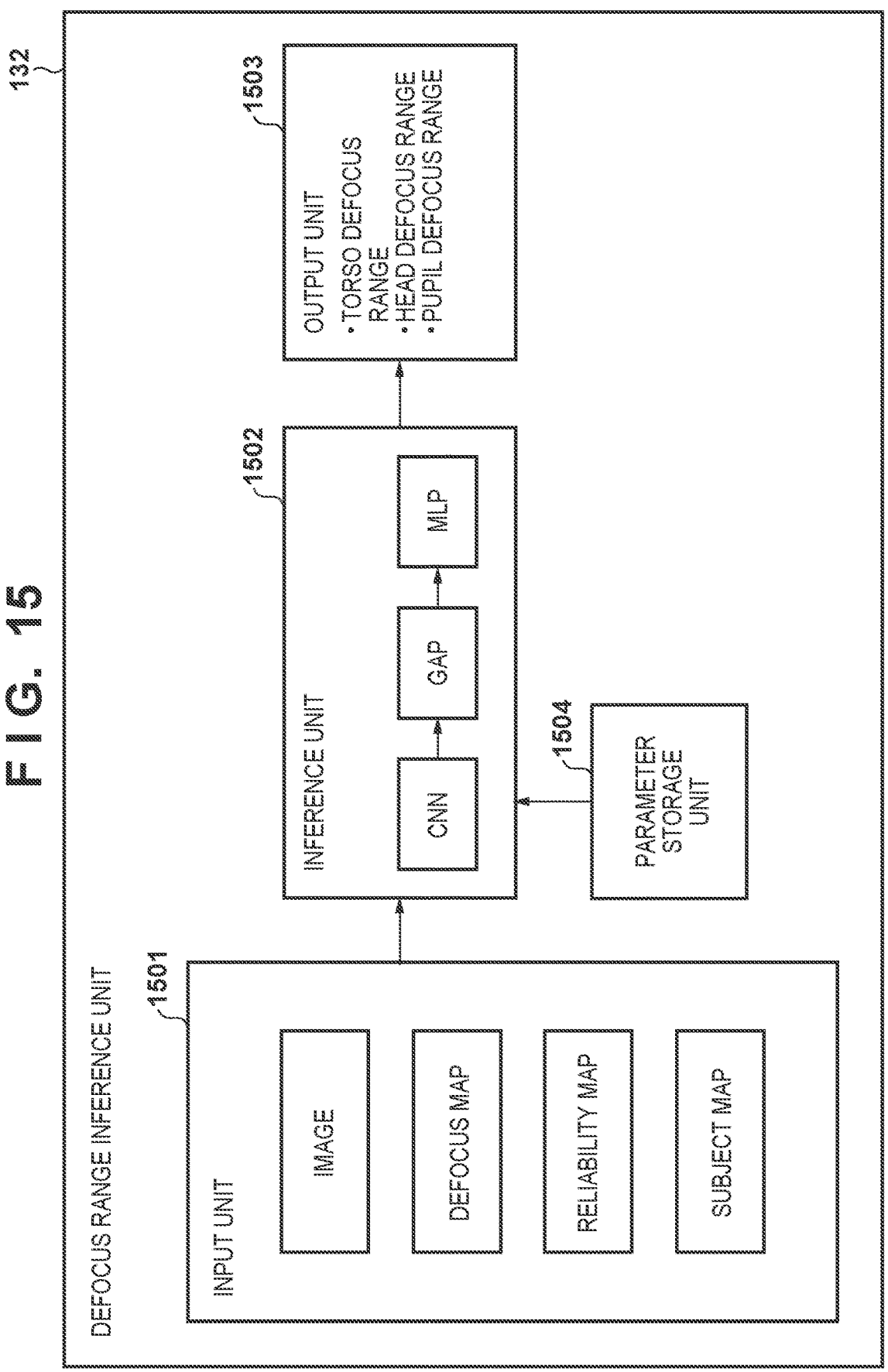

INFERENCE APPARATUS, IMAGE CAPTURING APPARATUS, TRAINING APPARATUS, INFERENCE METHOD, TRAINING METHOD, AND STORAGE MEDIUM

BACKGROUND OF THE INVENTION

Field of the Invention

The present invention relates to an inference apparatus, an image capturing apparatus, a training apparatus, an inference method, a training method, and a storage medium.

Description of the Related Art

Image capturing apparatuses are known that perform focus adjustment whereby a subject is brought into focus by detecting distance information, such as a defocus amount, from each of a plurality of focus detection regions inside a subject region that includes the subject. Japanese Patent Laid-Open No. 2022-137760 discloses a technique to bring a main subject into focus by eliminating the influence of a blocking object that passes in front of the main subject. According to Japanese Patent Laid-Open No. 2022-137760, a focus adjustment apparatus distinguishes a region of a blocking object that passes in front of a main subject by using a statistical value for distance values corresponding to subject distances in a plurality of autofocus (AF) regions.

For example, in a situation where a user wishes to focus on a face of a person, there may be a case where an arm or a hand of the same person is blocking the face. For example, in a case where the arm is blocking the face, a face region includes a region in which the face is absent (that is to say, a region of the arm blocking the face), and the focus detection results in the face region exhibit a continuous change from the face to the arm. In this case, with the technique of Japanese Patent Laid-Open No. 2022-137760, it is difficult to suppress the influence of the arm and focus on the face.

Furthermore, the focus detection results tend to vary significantly, for example, in a case where shooting is performed in a low-illuminance environment, in a case where a subject exhibits low contrast, in a case where a shooting optical system has a large f-number, and so forth. This leads to the possibility that the focus detection results inside a subject region include a focus detection result with a relatively large error. In this case, as an error in a focus detection result occurs in accordance with a predetermined distribution, such as a normal distribution, it is difficult to suppress the influence of an erroneous focus detection result with the technique of Japanese Patent Laid-Open No. 2022-137760, which uses a statistical value.

SUMMARY OF THE INVENTION

The present invention has been made in view of the foregoing situation. The present invention provides a technique to suppress a contribution made by distance information that is not based on a subject (e.g., distance information corresponding to a blocking object, and distance information with a relatively large detection error) when using a plurality of distance information pieces detected from a plurality of focus detection regions inside a subject region.

According to a first aspect of the present invention, there is provided an inference apparatus comprising at least one processor and/or at least one circuit which functions as: an inference unit configured to perform inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject, wherein the machine learning model is a model that has been trained to suppress a contribution made to the inference result by one or more distance information pieces that are not based on the subject among the plurality of distance information pieces.

According to a second aspect of the present invention, there is provided an image capturing apparatus, comprising: the inference apparatus according to the first aspect, wherein the at least one processor and/or the at least one circuit further functions as: an image capturing unit configured to generate the image through the shooting; a first detection unit configured to detect the subject region from the image; and a second detection unit configured to detect the plurality of distance information pieces from the plurality of focus detection regions inside the subject region.

According to a third aspect of the present invention, there is provided an inference apparatus comprising at least one processor and/or at least one circuit which functions as: an obtainment unit configured to obtain an image obtained through shooting, information of a subject region including a subject within the image, and a plurality of distance information pieces that respectively correspond to a plurality of regions inside the subject region; and an inference unit configured to perform inference with use of a machine learning model using, as inputs, the image, the information of the subject region, and the plurality of distance information pieces, thereby generating an inference result indicating a distance information piece corresponding to the subject or a distance information range corresponding to the subject.

According to a fourth aspect of the present invention, there is provided the inference apparatus according to the third aspect, wherein the obtainment unit obtains a plurality of distance information pieces corresponding to a plurality of parts of the subject, and the inference unit generates an inference result indicating a plurality of distance information ranges corresponding to the plurality of parts.

According to a fifth aspect of the present invention, there is provided an image capturing apparatus, comprising: the inference apparatus according to the fourth aspect, wherein the at least one processor and/or the at least one circuit further functions as: an image capturing unit configured to generate the image through the shooting; and a determination unit configured to, based on priority degrees of the plurality of parts, determine a part to be focused on from the plurality of distance information ranges corresponding to the plurality of parts output from the inference apparatus.

According to a sixth aspect of the present invention, there is provided a training apparatus comprising at least one processor and/or at least one circuit which functions as: an inference unit configured to perform inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject; and a training unit configured to train the machine learning model so that the inference result approaches ground truth information to which a contribution made by one or more distance information pieces that are not based on the subject among the plurality of distance information pieces is suppressed.

According to a seventh aspect of the present invention, there is provided an inference method executed by an inference apparatus, comprising: performing inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject, wherein the machine learning model is a model that has been trained to suppress a contribution made to the inference result by one or more distance information pieces that are not based on the subject among the plurality of distance information pieces.

According to an eighth aspect of the present invention, there is provided a training method executed by a training apparatus, comprising: performing inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject; and training the machine learning model so that the inference result approaches ground truth information to which a contribution made by one or more distance information pieces that are not based on the subject among the plurality of distance information pieces is suppressed.

According to a ninth aspect of the present invention, there is provided a non-transitory computer-readable storage medium which stores a program for causing a computer to execute an inference method comprising: performing inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject, wherein the machine learning model is a model that has been trained to suppress a contribution made to the inference result by one or more distance information pieces that are not based on the subject among the plurality of distance information pieces.

According to a tenth aspect of the present invention, there is provided a non-transitory computer-readable storage medium which stores a program for causing a computer to execute a training method comprising: performing inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject; and training the machine learning model so that the inference result approaches ground truth information to which a contribution made by one or more distance information pieces that are not based on the subject among the plurality of distance information pieces is suppressed.

Further features of the present invention will become apparent from the following description of exemplary embodiments with reference to the attached drawings.

BRIEF DESCRIPTION OF THE DRAWINGS

FIG. 7 is a diagram showing the details of a subject detection unit 130.

FIG. 15 is a diagram showing the details of a defocus range inference unit 132.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be

First Embodiment

Configuration of Image Capturing Apparatus 10

Figure 1:
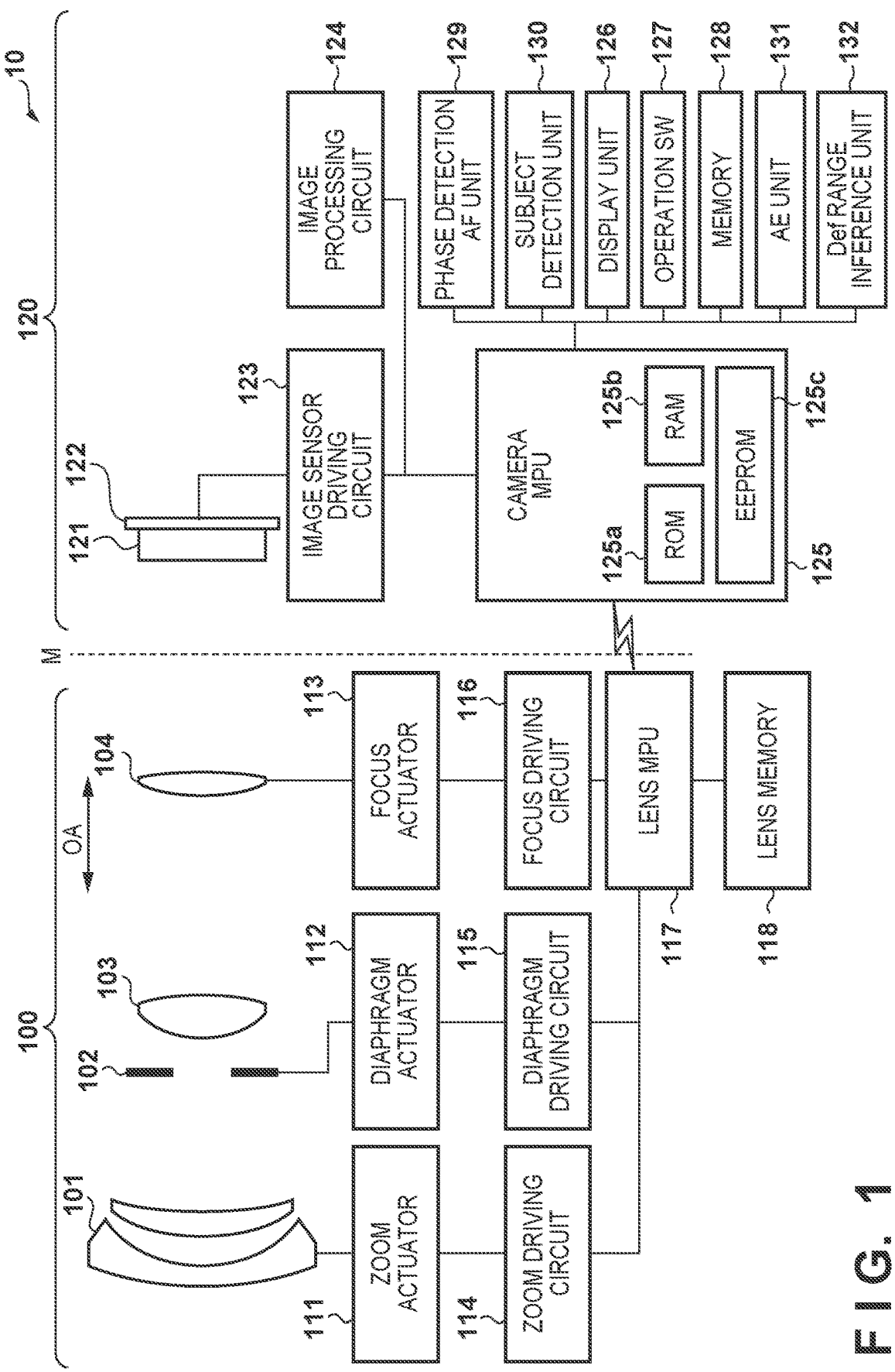
FIG. 1 is a block diagram of an image capturing apparatus 10 that includes an inference apparatus.

FIG. 1 is a block diagram of an image capturing apparatus 10 (a digital single-lens reflex camera with an interchangeable lens) that includes an inference apparatus. The image capturing apparatus 10 is a camera system that includes a lens unit 100 (an interchangeable lens) and a camera body 120. The lens unit 100 is detachably attached to the camera body 120 via a mount M indicated by a dash line in FIG. 1. Note that the present embodiment is not limited to this configuration, and is also applicable to an image capturing apparatus (digital camera) in which a lens unit (an image capturing optical system) and a camera body are integrally configured. Furthermore, the present embodiment is not limited to a digital camera, and is also applicable to other image capturing apparatuses, such as a video camera.

The lens unit 100 includes a first lens assembly 101, a diaphragm 102, a second lens assembly 103, and a focus lens assembly (hereinafter simply referred to as "focus lens 104") as an optical system, and a drive/control system. As such, the lens unit 100 is a photographing lens (an image capturing optical system) that includes the focus lens 104 and forms a subject image.

The first lens assembly 101 is arranged at the front end of the lens unit 100, and is held in such a manner that it can advance and recede in the optical axis direction OA. The diaphragm 102 adjusts the amount of light during shooting by adjusting an aperture diameter thereof, and also functions as a shutter for adjusting the exposure time during shooting of still images. The diaphragm 102 and the second lens assembly 103 can move integrally in the optical axis direction OA, and realize a zoom function in coordination with the advancing/receding operation of the first lens assembly 101. The focus lens 104 can move in the optical axis direction OA; a subject distance (a focusing distance) at which the lens unit 100 achieves focus changes in accordance with a position thereof. Controlling the position of the focus lens 104 in the optical axis direction OA enables focus adjustment (focus control) for adjusting the focusing distance of the lens unit 100.

The drive/control system includes a zoom actuator 111, a diaphragm actuator 112, a focus actuator 113, a zoom driving circuit 114, a diaphragm driving circuit 115, a focus driving circuit 116, a lens MPU 117, and a lens memory 118. The zoom driving circuit 114 drives the first lens assembly 101 and the second lens assembly 103 in the optical axis direction OA with use of the zoom actuator 111, thereby controlling the angle of view of the optical system in the lens unit 100 (performing a zoom operation). The diaphragm driving circuit 115 drives the diaphragm 102 with use of the diaphragm actuator 112, thereby controlling the aperture diameter and the opening/closing operation of the diaphragm 102. The focus driving circuit 116 drives the focus lens 104 in the optical axis direction OA with use of the focus actuator 113, thereby controlling the focusing distance of the optical system in the lens unit 100 (performing focus control). Also, the focus driving circuit 116 has functions as a position detection unit that detects a current position of the focus lens 104 (a lens position) using the focus actuator 113.

The lens MPU 117 (processor) controls the zoom driving circuit 114, diaphragm driving circuit 115, and focus driving circuit 116 by performing computation and control related to the operations of the lens unit 100. Furthermore, the lens MPU 117 is connected to a camera MPU 125 via the mount M, and communicates commands and data. For example, the lens MPU 117 detects the position of the focus lens 104, and gives notice of lens position information in response to a request from the camera MPU 125. This lens position information includes information of, for example, the position of the focus lens 104 in the optical axis direction OA, the position of an exit pupil in the optical axis direction OA and the diameter thereof in a state where the optical system has not moved, and the position of a lens frame, which restricts light beams in the exit pupil, in the optical axis direction OA and the diameter thereof. Also, the lens MPU 117 controls the zoom driving circuit 114, diaphragm driving circuit 115, and focus driving circuit 116 in response to a request from the camera MPU 125.

The lens memory 118 stores optical information necessary for automatic focus adjustment (AF control). The camera MPU 125 controls the operations of the lens unit 100 by executing a program stored in, for example, a built-in nonvolatile memory or the lens memory 118.

The camera body 120 includes an optical low-pass filter 121, an image sensor 122, and a drive/control system. The optical low-pass filter 121 and the image sensor 122 function as an image capturing unit that applies photoelectric conversion to a subject image (an optical image) formed via the lens unit 100 and outputs image data. In the present embodiment, the image sensor 122 applies photoelectric conversion to a subject image formed via the shooting optical system, and outputs a captured image signal and focus detection signals respectively as image data. Furthermore, in the present embodiment, the first lens assembly 101, diaphragm 102, second lens assembly 103, focus lens 104, and optical low-pass filter 121 compose the image capturing optical system.

The optical low-pass filter 121 alleviates false color and moiré of shot images. The image sensor 122 is composed of a CMOS image sensor and peripheral circuits thereof, and includes m pixels and n pixels arranged therein in the horizontal direction and the vertical direction, respectively (where m and n are integers equal to or larger than two). The image sensor 122 of the present embodiment also plays a role of a focus detection element and has a pupil division function, and includes pupil division pixels that enable focus detection based on a phase-difference detection method (phase detection AF) that uses image data (an image signal). Based on image data output from the image sensor 122, an image processing circuit 124 generates data for phase detection AF and image data for display, recording, and subject detection.

The drive/control system includes an image sensor driving circuit 123, the image processing circuit 124, the camera MPU 125, a display unit 126, an operation switch assembly 127 (operation SW), a memory 128, a phase detection AF unit 129, a subject detection unit 130, an AE unit 131, and a defocus range inference unit 132. The image sensor driving circuit 123 controls the operations of the image sensor 122, and also applies A/D conversion to an image signal (image data) output from the image sensor 122 and transmits the image signal to the camera MPU 125. The image processing circuit 124 executes general image processing executed on a digital camera, such as γ conversion, color interpolation processing, and compression encoding processing, with respect to an image signal output from the image sensor 122. Also, the image processing circuit 124 generates a signal for phase detection AF, a signal for AE, and a signal for subject detection. Although the image processing circuit 124 generates each of the signal for phase detection AF, the signal for AE, and the signal for subject detection in the present embodiment, it may generate, for example, the signal for AE and the signal for subject detection as the same signal. Furthermore, a combination of signals that are generated as the same signal is not limited to the foregoing.

The camera MPU 125 (processor) performs computation and control related to the operations of the camera body 120. That is to say, the camera MPU 125 controls the image sensor driving circuit 123, image processing circuit 124, display unit 126, operation switch assembly 127, memory 128, phase detection AF unit 129, subject detection unit 130, AE unit 131, and defocus range inference unit 132. The camera MPU 125 is connected to the lens MPU 117 via a signal line of the mount M, and communicates commands and data with the lens MPU 117. The camera MPU 125 issues requests for obtaining a lens position and for driving a lens by a predetermined driving amount to the lens MPU 117. Also, the camera MPU 125 issues, for example, a request for obtaining optical information unique to the lens unit 100 to the lens MPU 117.

The camera MPU 125 includes, embedded therein, a ROM 125a that stores a program for controlling the operations of the camera body 120, a RAM 125b (camera memory) that stores variables, and an EEPROM 125c that stores various types of parameters. Also, the camera MPU 125 executes focus detection processing based on the program stored in the ROM 125a. In the focus detection processing, known correlation computation processing is executed using a pair of image signals obtained by applying photoelectric conversion to an optical image formed by light beams that have passed through pupil regions (pupil partial regions) in the image capturing optical system that are different from each other.

The display unit 126 is composed of an LCD and the like, and displays information related to a shooting mode of the image capturing apparatus 10, a preview image prior to shooting, an image for confirmation after shooting, an in-focus state display image at the time of focus detection, and so forth. The operation switch assembly 127 is composed of a power switch, a release (shooting trigger) switch, a zoom operation switch, a shooting mode selection switch, and so forth. The memory 128 is an attachable/removable flash memory, and images that have already been shot are recorded therein.

The phase detection AF unit 129 executes focus detection processing in accordance with a phase-difference detection method based on image data for focus detection (a signal for phase detection AF) obtained from the image sensor 122 and the image processing circuit 124. More specifically, the image processing circuit 124 generates a pair of image data pieces formed by light beams that pass through a pair of pupil regions in the image capturing optical system as image data for focus detection. The phase detection AF unit 129 detects a focus displacement amount based on the amount of displacement between the pair of image data pieces. In this way, the phase detection AF unit 129 of the present embodiment performs phase detection AF (image capturing plane phase detection AF) based on an output of the image sensor 122 without using a dedicated AF sensor. Note that a constituent(s) in at least a part of the phase detection AF unit 129 may be provided in the camera MPU 125. The details of the operations of the phase detection AF unit 129 will be described later.

The subject detection unit 130 executes subject detection processing based on a signal for subject detection generated by the image processing circuit 124. Through the subject detection processing, the position and the size (a subject detection region) are detected for each of the types, states, and parts of a subject. The details of the operations of the subject detection unit 130 will be described later.

The AE unit 131 executes exposure adjustment processing for optimizing shooting conditions by performing photometry based on a signal for AE obtained from the image sensor 122 and the image processing circuit 124. Specifically, the AE unit 131 executes photometry based on a signal for AE, and calculates an exposure amount under the diaphragm value, shutter speed, and ISO sensitivity that are currently set. The AE unit 131 executes the exposure adjustment processing by computing the appropriate diaphragm value, shutter speed, and ISO sensitivity to be set during shooting based on the difference between the calculated exposure amount and a preset appropriate exposure amount, and setting them as shooting conditions.

The defocus range inference unit 132 uses, as inputs, image information including an intra-image region of a subject detected by the subject detection unit 130 and position information thereof, focus detection information detected by the phase detection AF unit 129, and so forth, and outputs a defocus range of the detected subject. The details of the operations of the defocus range inference unit 132 will be described later.

As described above, the image capturing apparatus 10 of the present embodiment can execute phase detection AF, photometry (exposure adjustment), and subject detection in combination, and select a target position (an image height range) at which phase detection AF and photometry are to be executed in accordance with the result of subject detection. Furthermore, by obtaining the result of inference of a defocus range corresponding to a subject detection region, a correct or highly accurate focus detection result can be selected from among a plurality of focus detection results detected from within a subject.

Configuration of Image Sensor 122

Figure 2:
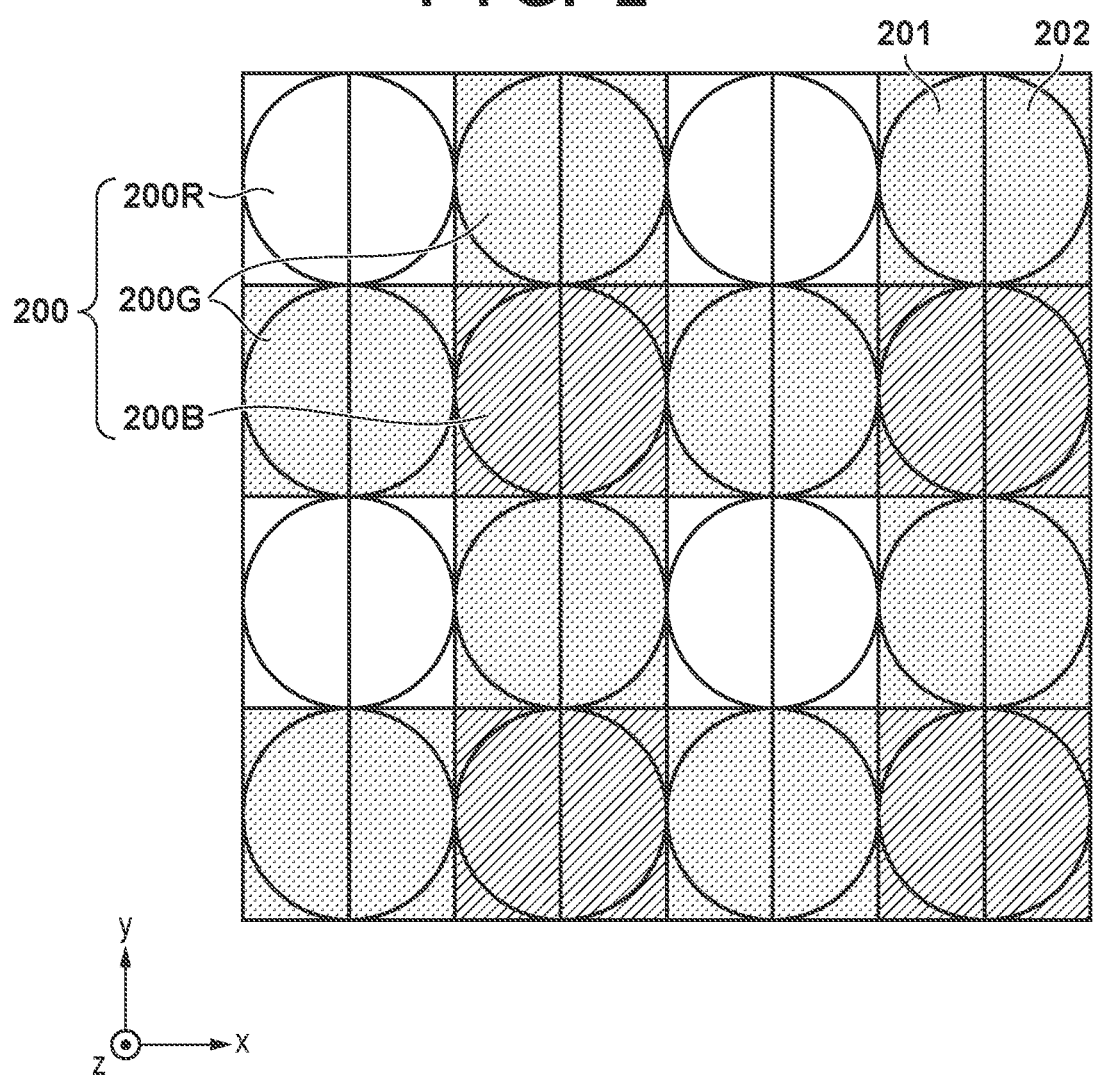
FIG. 2 is a schematic diagram of an arrangement of image capturing pixels and focus detection pixels in an image sensor 122.

FIG. 2 is a schematic diagram of an arrangement of image capturing pixels and focus detection pixels in the image sensor 122. FIG. 2 shows an arrangement of pixels in the image sensor 122, which is a two-dimensional CMOS sensor, in a range of four columns×four rows, and an arrangement of focus detection pixels in a range of eight columns×four rows. In the first embodiment, in a pixel group 200 having two columns×two rows shown in FIG. 2, a pixel 200R with a spectral sensitivity corresponding to R (red) is located at the upper left, a pixel 200G with a spectral sensitivity corresponding to G (green) is located at the upper right and the lower left, and a pixel 200B with a spectral sensitivity corresponding to B (blue) is located at the lower right. Furthermore, each pixel is composed of a first focus detection pixel 201 and a second focus detection pixel 202 arranged in two columns×one row.

The pixels in four columns×four rows (the focus detection pixels in eight columns×four rows) shown in FIG. 2 are arranged on a plane in large numbers; this enables obtainment of a captured image (focus detection signals). For example, a pixel pitch P is 4 μm, the number of pixels N is 5575 columns horizontally×3725 rows vertically=approximately 20.75 megapixels, a column-wise pitch of focus detection pixels PAF is 2 μm, and the number of focus detection pixels NAF is 11150 columns horizontally×3725 rows vertically=approximately 41.50 megapixels.

Figure 3A:
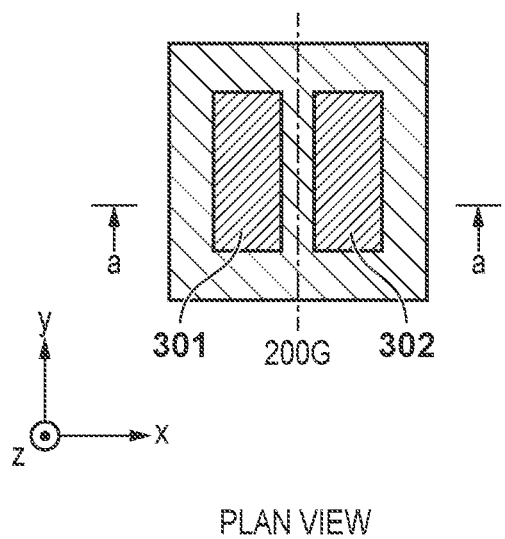
FIG. 3A is a plan view of one pixel 200G in the image sensor 122 as viewed from the side of a light receiving surface of the image sensor 122 (the +z side).
Figure 3B:
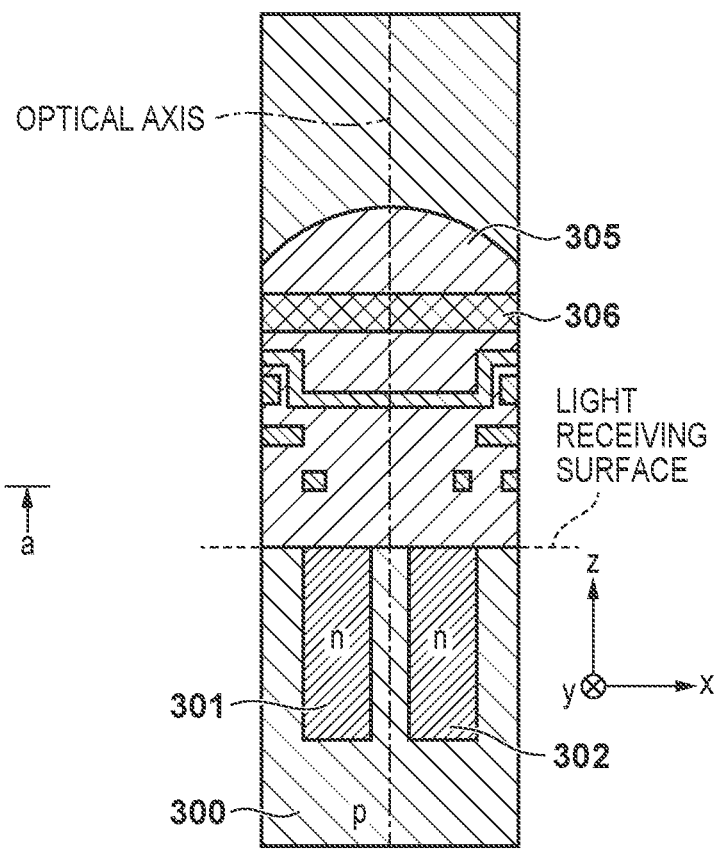
FIG. 3B is a cross-sectional diagram of an a-a cross section of FIG. 3A as viewed from the −y side.

FIG. 3A is a plan view of one pixel 200G in the image sensor 122 as viewed from the side of a light receiving surface of the image sensor 122 (the +z side). FIG. 3B is a cross-sectional diagram of an a-a cross-section of FIG. 3A as viewed from the −y side.

As shown in FIGS. 3A and 3B, in each pixel of the image sensor 122, a microlens 305 for collecting incident light is formed on the light receiving side of the pixel, and a photoelectric conversion unit 301 and a photoelectric conversion unit 302 are formed as a result of division into NH (two) in the x direction and division into NV (one) in the y direction. The photoelectric conversion unit 301 and the photoelectric conversion unit 302 respectively correspond to the first focus detection pixel 201 and the second focus detection pixel 202.

The photoelectric conversion unit 301 and the photoelectric conversion unit 302 may be pin-structure photodiodes in which an intrinsic layer is sandwiched between a p-type layer and an n-type layer, or may be a p-n junction photodiode in which an intrinsic layer is omitted. In each pixel, a color filter 306 is formed between the microlens 305 and the photoelectric conversion units 301, 302. Furthermore, where necessary, the spectral transmittance of the color filter may vary on a per-subpixel basis, or the color filter may be omitted.

Light incident on the pixel 200G shown in FIGS. 3A and 3B is collected by the microlens 305, dispersed by the color filter 306, and then received by the photoelectric conversion unit 301 and the photoelectric conversion unit 302. In the photoelectric conversion unit 301 and the photoelectric conversion unit 302, electron-hole pairs are generated in accordance with the amount of received light, and separated in a depletion layer; then, negatively-charged electrons are accumulated in the n-type layer, whereas holes are discharged to the outside of the image sensor 122 via the p-type layer connected to a constant-voltage source (not shown). The electrons accumulated in the n-type layers of the photoelectric conversion unit 301 and the photoelectric conversion unit 302 are transferred to a capacitance unit (FD) via a transfer gate, and converted into a voltage signal.

Figure 4:
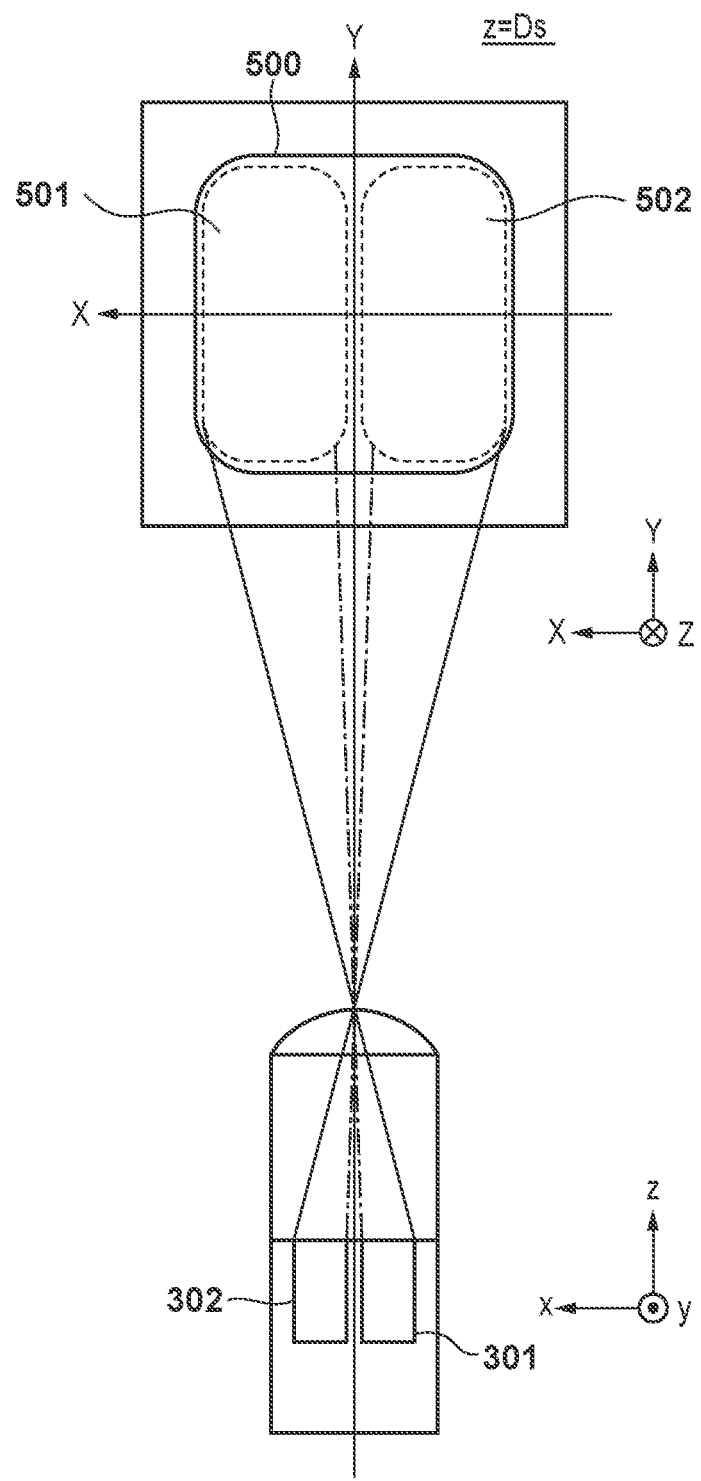
FIG. 4 is a schematic explanatory diagram showing a correspondence relationship between a pixel structure shown in FIGS. 3A and 3B and pupil division.

FIG. 4 is a schematic explanatory diagram showing a correspondence relationship between the pixel structure shown in FIGS. 3A and 3B and pupil division. FIG. 4 shows a cross-sectional diagram of the a-a cross-section of the pixel structure shown in FIG. 3A as viewed from the +y side, and a pupil plane of the image sensor 122 (a pupil distance Ds). In FIG. 4, for the sake of consistency with the coordinate axes of the pupil plane of the image sensor 122, the x-axis and the y-axis of the cross-sectional diagram are inverted relative to FIGS. 3A and 3B.

In FIG. 4, a first pupil partial region 501 is placed in a substantially conjugate relationship, by the microlens, with a light receiving surface of the photoelectric conversion unit 301 whose center of mass is decentered in the −x direction, and represents a pupil region via which light can be received by the first focus detection pixel 201. The center of mass of the first pupil partial region 501 is decentered toward the +X side on the pupil plane. In FIG. 4, a second pupil partial region 502 is placed in a substantially conjugate relationship, by the microlens, with a light receiving surface of the photoelectric conversion unit 302 whose center of mass is decentered in the +x direction, and represents a pupil region via which light can be received by the second focus detection pixel 202. The center of mass of the second pupil partial region 502 is decentered toward the −X side on the pupil plane. Furthermore, in FIG. 4, a pupil region 500 is a pupil region via which light can be received by the pixel 200G as a whole, with the entireties of the photoelectric conversion unit 301 and the photoelectric conversion unit 302 (the first focus detection pixel 201 and the second focus detection pixel 202) combined.

The image capturing plane phase detection AF is influenced by diffraction because pupil division is performed using the microlenses of the image sensor 122. In FIG. 4, the pupil distance to the pupil plane of the image sensor 122 is several tens of millimeters, whereas the diameter of the microlenses is several micrometers. As a result, the diaphragm value of the microlenses is several tens of thousands, and a diffraction blur occurs at the level of several tens of millimeters. Therefore, images on the light-receiving surfaces of the photoelectric conversion units exhibit the characteristics of light receiving sensitivity (the distribution of incidence angles for light receiving rates), rather than being clear pupil regions or pupil partial regions.

Figure 5:
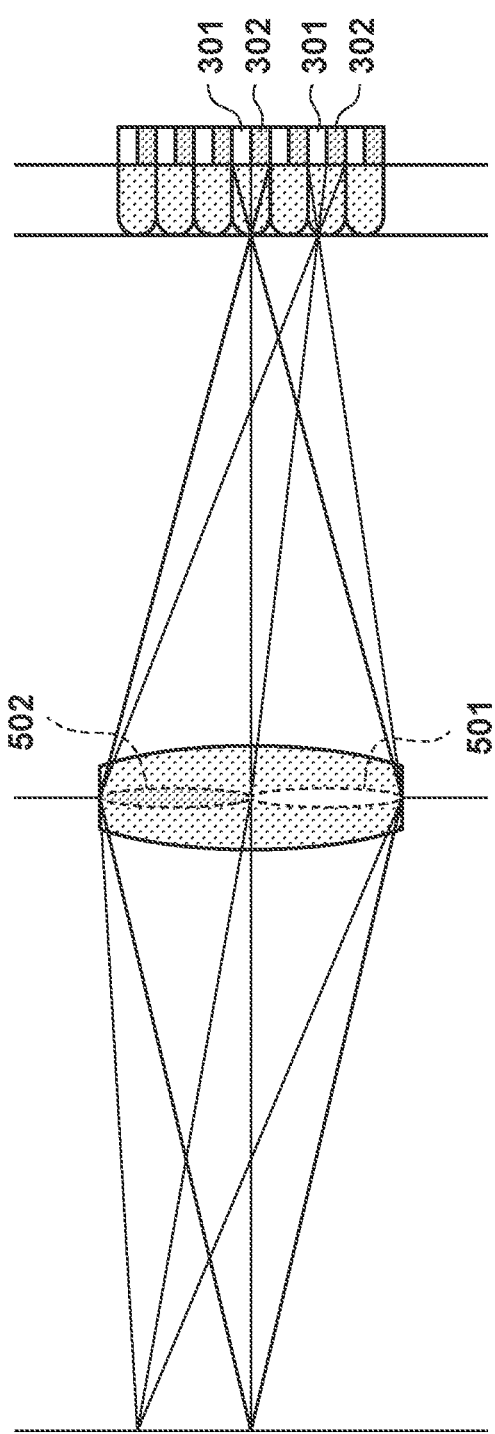
FIG. 5 is a schematic diagram showing a correspondence relationship between the image sensor 122 and pupil division.

FIG. 5 is a schematic diagram showing a correspondence relationship between the image sensor 122 and pupil division. Light beams that have passed through different pupil partial regions in the first pupil partial region 501 and the second pupil partial region 502 are incident on the respective pixels in the image sensor 122 at different angles, and received by the first focus detection pixels 201 and the second focus detection pixels 202 resulting from 2×1 division. In the example of FIG. 5, the pupil region is divided into two parts in the horizontal direction. Where necessary, pupil division may be performed in the vertical direction. Where necessary, it is permissible to adopt a configuration in which the image capturing pixels, the first focus detection pixels, and the second focus detection pixels are discrete pixel components, and the first focus detection pixels and the second focus detection pixels are arranged sectionally in a part of the arrangement of the image capturing pixels.

In the first embodiment, focus detection is performed by generating a first focus signal from a collection of received light signals of the first focus detection pixels 201 in the respective pixels of the image sensor 122, and generating a second focus signal from a collection of received light signals of the second focus detection pixels 202 in the respective pixels. Furthermore, signals of the first focus detection pixel 201 and the second focus detection pixel 202 are added on a per-pixel basis in the image sensor 122; as a result, a captured image signal (a captured image) with a resolution corresponding to the number of effective pixels N is generated. A method of generating each signal is not limited in particular; for example, a second focus detection signal may be generated from the difference between the captured image signal and the first focus signal.

Relationship Between Defocus Amount and Image Displacement Amount

Figure 6:
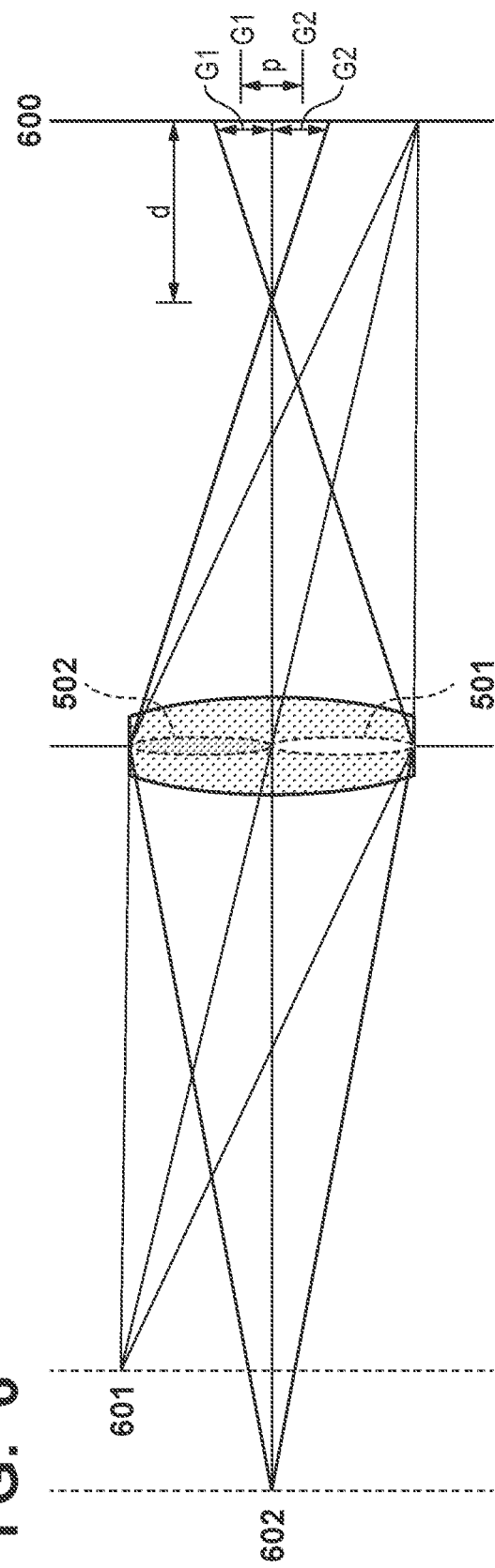
FIG. 6 is a schematic diagram showing a relationship between a defocus amount corresponding to a first focus detection signal and a second focus detection signal obtained by the image sensor 122 and an amount of image displacement between the first focus detection signal and the second focus detection signal.

FIG. 6 is a schematic diagram showing a relationship between a defocus amount corresponding to a first focus detection signal and a second focus detection signal obtained by the image sensor 122 and an amount of image displacement between the first focus detection signal and the second focus detection signal. The image sensor 122 is arranged on an image capturing plane 600. Similarly to FIG. 4 and FIG. 5, the pupil plane of the image sensor 122 is divided into two parts, namely the first pupil partial region 501 and the second pupil partial region 502. Regarding a defocus amount d, provided that the distance from the image formation position of a subject to the image capturing plane is a magnitude |d|, a front focus state, in which the image formation position of the subject is closer to the subject side than the image capturing plane is, is defined using a negative sign (d<0). On the other hand, a rear focus state, in which the image formation position of the subject is farther from the subject than the image capturing plane is, is defined using a positive sign (d>0). In an in-focus state where the image formation position of the subject is on the image capturing plane (in-focus position), d=0. FIG. 6 shows an example in which a subject 601 is in the in-focus state (d=0), whereas a subject 602 is in the front focus state (d<0). The front focus state (d<0) and the rear focus state (d>0) are collectively considered as a defocus state (|d|>0).

In the front focus state (d<0), among light beams from the subject 602, light beams that have passed through the first pupil partial region 501 (second pupil partial region 502) are collected, and then dispersed to have a width Γ1 (Γ2) centered at a mass center position G1 (G2) of the light beams, thereby forming a blurred image on the image capturing plane 600. Light of the blurred image is received by the first focus detection pixel 201 (second focus detection pixel 202) that composes each pixel arranged in the image sensor 122, and a first focus detection signal (second focus detection signal) is generated. Therefore, the first focus detection signal (second focus detection signal) is recorded as a subject image of the subject 602 that has been blurred over the width Γ1 (Γ2) at the mass center position G1 (G2) on the image capturing plane 600. The blur width Γ1 (Γ2) of the subject image increases substantially in proportion to an increase in the magnitude |d| of the defocus amount d. Similarly, a magnitude |p| of an amount of image displacement p between the subject images of the first focus detection signal and the second focus detection signal (=the difference between the mass center positions of light beams, G1−G2) also increases substantially in proportion to an increase in the magnitude |d| of the defocus amount d. The same goes for the rear focus state (d>0), although the direction of image displacement between the subject images of the first focus detection signal and the second focus detection signal is opposite to that in the front focus state.

The magnitude of the amount of image displacement between the first focus detection signal and the second focus detection signal increases with an increase in the magnitude of the defocus amount of the first focus detection signal and the second focus detection signal, or the captured image signal obtained by adding the first focus detection signal and the second focus detection signal. In view of this, based on the relationship where the magnitude of the amount of image displacement between the first focus detection signal and the second focus detection signal increases with an increase in the magnitude of the defocus amount of the captured image signal, the phase detection AF unit 129 converts the amount of image displacement into a detected defocus amount in accordance with a conversion coefficient calculated based on a base-line length.

Configuration of Subject Detection Unit 130

FIG. 7 is a diagram showing the details of the subject detection unit 130. The subject detection unit 130 includes an image data generation unit 710, a detection unit 711, a detection history storage unit 712, a dictionary data selection unit 713, and a dictionary data storage unit 714. The image data generation unit 710, detection unit 711, detection history storage unit 712, dictionary data selection unit 713, and dictionary data storage unit 714 may be a part of the camera MPU 125, or may be provided separately from the camera MPU 125.

Image data output from the image processing circuit 124 is input to the image data generation unit 710. In a case where dictionary data for entire region detection has been selected by the later-described dictionary data selection unit 713, the image data generation unit 710 generates image data for entire region detection by using the input image data, and transmits the generated image data to the detection unit 711. On the other hand, in a case where dictionary data for local region detection has been selected by the dictionary data selection unit 713, the image data generation unit 710 generates image data for local region detection based on a detection history of the later-described detection history storage unit 712, and transmits the generated image data to the detection unit 711. A specific method of generating the image data for entire region detection and the image data for local region detection will be described later.

The detection unit 711 obtains the dictionary data selected by the dictionary data selection unit 713 from among the dictionary data pieces which are stored in the dictionary data storage unit 714 and which have been generated through machine learning. Then, using the dictionary data obtained from the dictionary data storage unit 714, the detection unit 711 performs subject detection with respect to the image data input from the image data generation unit 710. The detection unit 711 estimates, for example, the position of a subject included in the image data as a detection result, and stores the result of estimation into the detection history storage unit 712.

In the present embodiment, it is assumed that the detection unit 711 is composed of a convolutional neural network (CNN) that has undergone machine learning, and performs entire region detection and local region detection for specific subjects. Subjects for which entire region detection and local region detection can be performed are based on the dictionary data pieces stored in the dictionary data storage unit 714. In the present embodiment, the detection unit 711 is composed of a CNN that differs between entire region detection and local region detection. Also, the detection unit 711 may be composed of a CNN that differs among detectable subjects. The detection unit 711 may be realized by a graphics processing unit (GPU) or a circuit dedicated to estimation processing executed by the CNN.

Machine learning of the CNN can be performed using any method. For example, a predetermined computer, such as a server, may perform machine learning of the CNN, and the camera body 120 may obtain the trained CNN from the predetermined computer. In the present embodiment, it is assumed that the CNN of the detection unit 711 is trained as a result of a predetermined computer receiving image data for training as an input, and performing supervised learning by using, for example, position information of a subject corresponding to the image data for training as supervisory data (annotation). Consequently, the trained CNN is generated. Note that training of the CNN may be performed in the camera body 120.

As described above, the detection unit 711 includes the CNN that has been trained through machine learning (a trained model). The detection unit 711 receives the image data as an input, estimates the position, size, reliability degree, and the like of a subject, and outputs the estimated information. The CNN may be, for example, a network in which a fully connected layer and an output layer are connected together with a layer structure in which a convolutional layer and a pooling layer are alternately layered. In this case, for example, an error backpropagation method or the like can be applied to training of the CNN. Furthermore, the CNN may be a neocognitron CNN that uses a feature detection layer (S-layer) and a feature integration layer (C-layer) as a set. In this case, a training method called "add-if-silent" can be applied to training of the CNN.

The detection unit 711 may use any trained model other than the trained CNN. For example, a trained model that has been generated through machine learning that uses a support vector machine, a decision tree, or the like may be applied to the detection unit 711. Furthermore, the detection unit 711 may not be a trained model generated through machine learning. For example, any subject detection method that does not use machine learning may be applied to the detection unit 711.

The detection history storage unit 712 stores a history of subject detection performed by the detection unit 711. The camera MPU 125 transmits the history to the image data generation unit 710 and the dictionary data selection unit 713. The history of subject detection includes, for example, dictionary data pieces that have been used in detection, the number of times detection has been performed, the positions of detected subjects, and identifiers of image data pieces that include detected subjects; however, it may be configured to include at least one of such data types.

The dictionary data storage unit 714 stores dictionary data pieces for detection of specific subjects. The camera MPU 125 reads out the dictionary data selected by the dictionary data selection unit 713 from the dictionary data storage unit 714, and transmits the same to the detection unit 711. Each dictionary data piece is, for example, data in which the features of each part of a specific subject are registered. Furthermore, in order to detect a plurality of types of subjects, it is permissible to use dictionary data pieces for the respective subjects and for the respective parts of the subjects. Therefore, the dictionary data storage unit 714 stores a plurality of dictionary data pieces. The dictionary data storage unit 714 stores a plurality of types of dictionary data for subject detection, such as dictionary data for detecting "person", dictionary data for detecting "animal", and dictionary data for detecting "vehicle". In addition, the dictionary data storage unit 714 can further divide the dictionary data for detecting "vehicle" into such categories as "automobile", "motorcycle", "train" and "airplane", and store them individually.

Moreover, in the present embodiment, dictionary data for entire region detection and dictionary data for local region detection are prepared for each of the aforementioned specific subjects. An entire region of a specific subject may be set as a region that literally includes the entire subject, or may be set as a region that includes a main part of the subject, such as a body. For example, in the case of a subject that belongs to "vehicle", an entire region can be set for each subject type, such as "vehicle body" of an automobile or a motorcycle, "first car" of a train, and "fuselage" of an airplane. Also, a local region, by definition, indicates a partial region of a subject specified by an entire region. A local region is set as a region included in an entire region; for example, "human pupil" is set as a local region relative to "entire human face" as an entire region, or "pupil" is set as a local region relative to "entire animal face" as an entire region. Furthermore, a positional relationship in which an entire region does not include a local region may be used, as in the case of "entire vehicle body of motorcycle" as an entire region and "driver's helmet" that is outside the vehicle body of the motorcycle as a local region.

Moreover, a relationship in which a local region is not necessarily present in an entire region of a subject may be used, as in the case of "entire vehicle body of automobile" and "driver's helmet" exclusive to "open-wheel car," which is a type of automobile.

As described above, dictionary data for local region detection is based on the premise that it is a partial region inside a subject detected in an entire region. Therefore, in the present embodiment, dictionary data used in detection of a local region is generated through training that uses, as an input image, an image whose background is a subject detected as an entire region, and uses the position or the size of a local region inside the input image as an annotation.

An entire region of a subject that has been detected using the plurality of dictionary data pieces stored in the dictionary data storage unit 714 can be used as focus detection regions. For example, a defocus range of the subject can be output using the results obtained from a plurality of focus detection regions arranged in the entire region.

However, for example, in a case where there is a large depth difference in hte entire region, the problem of which part of the entire region is to be brought into focus arises. In view of this problem, limiting a range with use of local region detection makes it possible to focus on a more specific position, which is unknown only by an entire region and depth information therein, such as "driver's seat" in a train and "cockpit" of an aircraft. Furthermore, in the case of "vehicle", such as a motorcycle, there is possibly a case where a focus position to be focused on differs between when a person is riding it and when no one is riding it. By performing entire region detection and local region detection with use of dictionary data pieces in which "entire vehicle body of motorcycle" is set as an entire region and "driver's helmet" is set as a local region, the position to be focused on can be switched depending on whether a driver is present or absent with respect to the same subject.

Furthermore, although the plurality of dictionary data pieces used by the detection unit 711 are generated through machine learning in the present embodiment, dictionary data generated by a rule-based system may be used in combination. Dictionary data generated by a rule-based system is, for example, data that stores an image of a subject to be detected or a feature amount specific to this subject, which has been determined by a designer. This subject can be detected by comparing the image or the feature amount of this dictionary data with an image or a feature amount of image data that has been obtained by performing image capturing. As dictionary data based on a rule-based system is less complicated than a trained model obtained through machine learning, it has a small data capacity. Also, subject detection that uses dictionary data based on a rule-based system has a faster processing speed (and a smaller processing load) than subject detection that uses a trained model.

Based on the detection history stored in the detection history storage unit 712, the dictionary data selection unit 713 selects a dictionary data piece to be used next, and notifies the image data generation unit 710 and the dictionary data storage unit 714 of the same.

In the present embodiment, dictionary data pieces for the respective types of subjects and the respective subject regions are stored individually in the dictionary data storage unit 714, and subject detection is performed multiple times by switching among the plurality of dictionary data pieces with respect to the same image data. The dictionary data selection unit 713 determines a sequence for switching among the dictionary data pieces based on the detection history stored in the detection history storage unit 712 and on a user selection, which will be described later, and determines a dictionary data piece to be used in accordance with the determined sequence.

In the dictionary data storage unit 714, the dictionary data pieces for detecting the plurality of types of subjects and the regions of the respective subjects are stored individually. A dictionary data piece selected by the dictionary data selection unit 713 is switched in accordance with whether there is a subject that has been detected thus far, a type of a dictionary data piece that was used at that time, a type of a subject to be detected preferentially, and a combination of these. The type of the subject to be detected preferentially may be selected by a user in advance. Also, a method in which the user designates a subject inside a live-view screen displayed on the display unit 126 may be used as a method of determining a subject to be detected preferentially. Furthermore, whether to perform local region detection may also be selected for each type of dictionary data pieces for entire region detection, or may be selected collectively by the user in advance. At this time, the camera MPU 125 may cause the display unit 126 to display information of the aforementioned user selection or the dictionary data piece selected by the dictionary data selection unit 713.

Figure 8A:
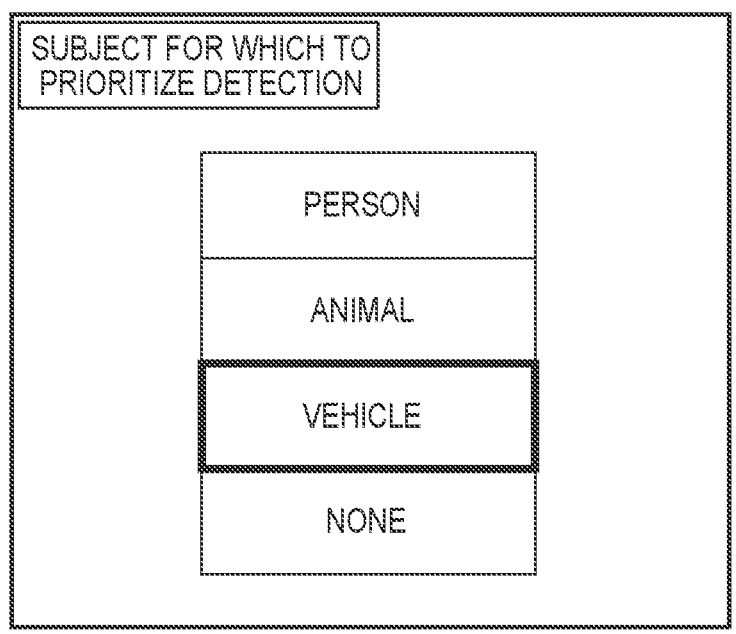
FIGS. 8A to 8C are diagrams showing an example in which a user selects a type of a subject to be detected preferentially, and whether to perform local region detection, from a menu screen displayed on a display unit 126.
Figure 8B:
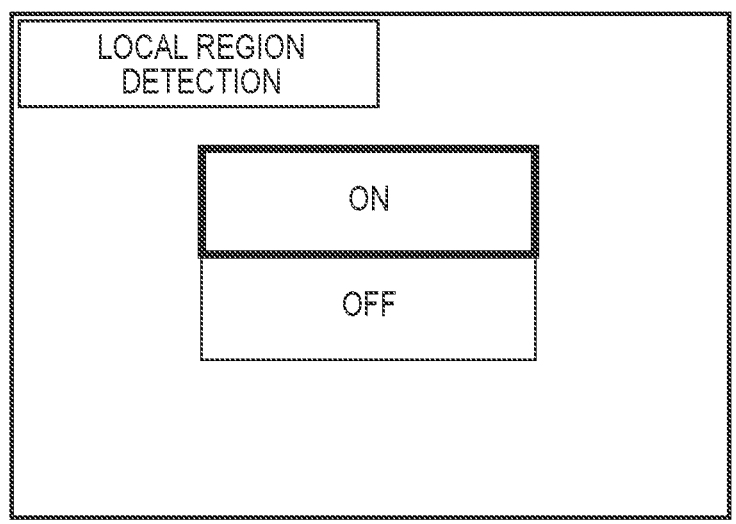
Figure 8C:
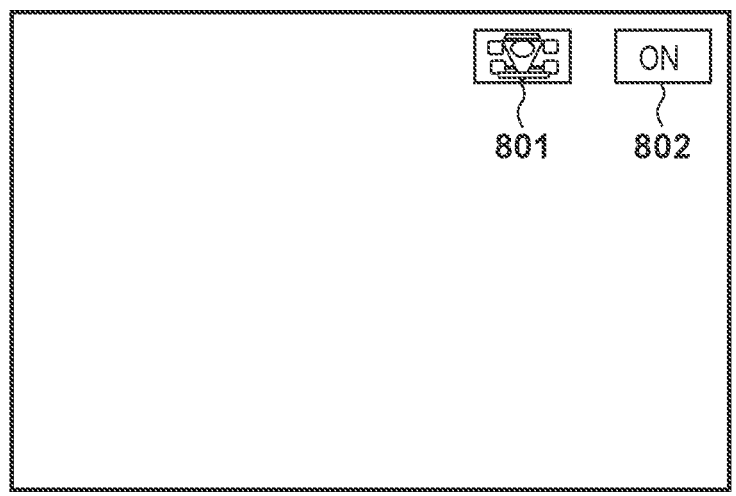

FIGS. 8A to 8C are diagrams showing an example in which the user selects a type of a subject to be detected preferentially, and whether to perform local region detection, from a menu screen displayed on the display unit 126. FIG. 8A shows a setting screen for selecting a subject to be detected, which is displayed on the display unit 126. The user operates the operation switch assembly 127 to select a subject to be detected preferentially from among detectable specific subjects (e.g., vehicle, animal, and person). FIG. 8B shows a setting screen about whether to perform local region detection, which is displayed on the display unit 126. The user operates the operation switch assembly 127 to select ON or OFF of local region detection (in FIG. 8B, ON of local region detection has been selected). FIG. 8C shows a live-view screen that is displayed on the display unit 126 in a state where the setting for the preferential subject and the setting for local region detection have been configured. The display unit 126 displays the result of selection of the preferential subject as a subject icon 801. Also, the display unit 126 displays the result of selection of whether to perform local region detection as a local region detection ON/OFF icon 802. In this way, the user can confirm the settings they have configured on the live-view screen.

Flow of Shooting Processing

Figure 9:
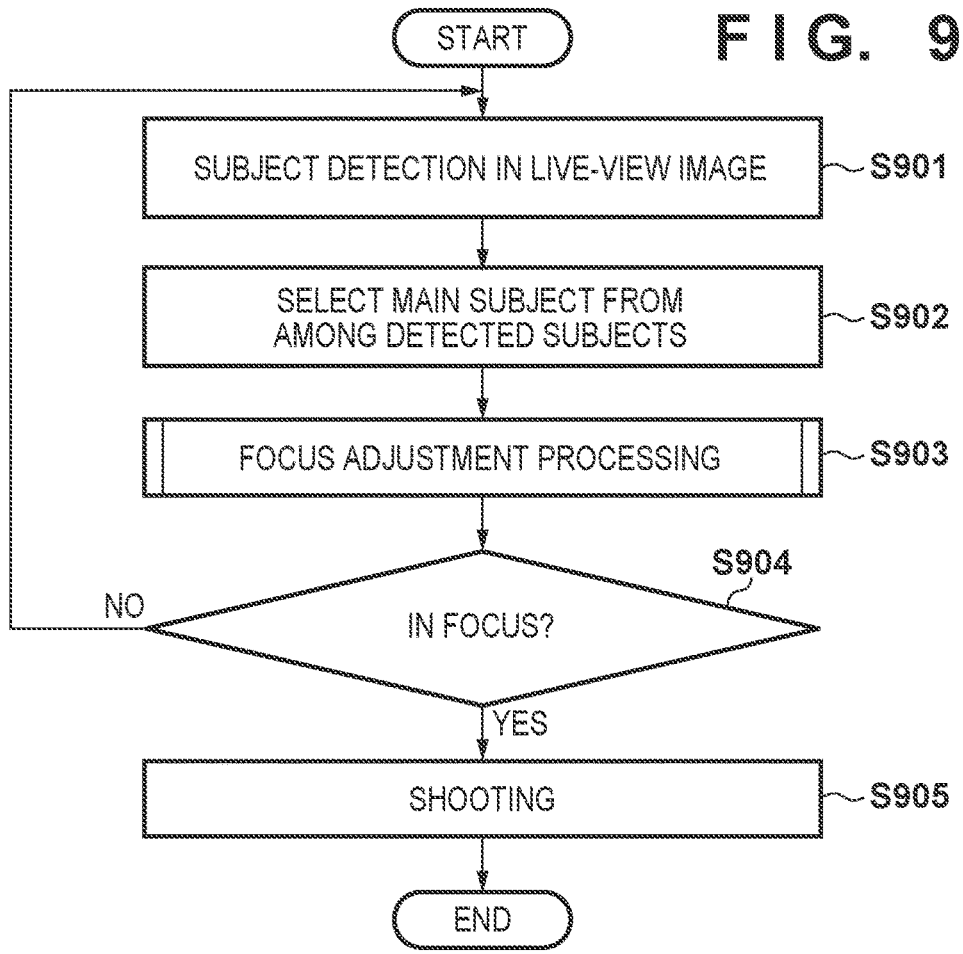
FIG. 9 is a flowchart of shooting processing executed by the image capturing apparatus 10.

FIG. 9 is a flowchart of shooting processing executed by the image capturing apparatus 10. Processing of each step shown in FIG. 9 is realized by at least one of the camera MPU 125 and the lens MPU 117 executing a control program and controlling other constituent elements included in the image capturing apparatus 10 as necessary, unless specifically stated otherwise.

In step S901, the camera MPU 125 executes the above-described subject detection by controlling the subject detection unit 130. Subject detection is performed with respect to, for example, one of live-view images that are shot repetitively. The following describes a case where a plurality of subjects corresponding to a plurality of parts of a predetermined type of subject have been detected. Below, it is assumed that the predetermined type of subject is a person, and the plurality of subjects corresponding to the plurality of parts of the person are a pupil, a face (head), and a torso.

Figure 10:
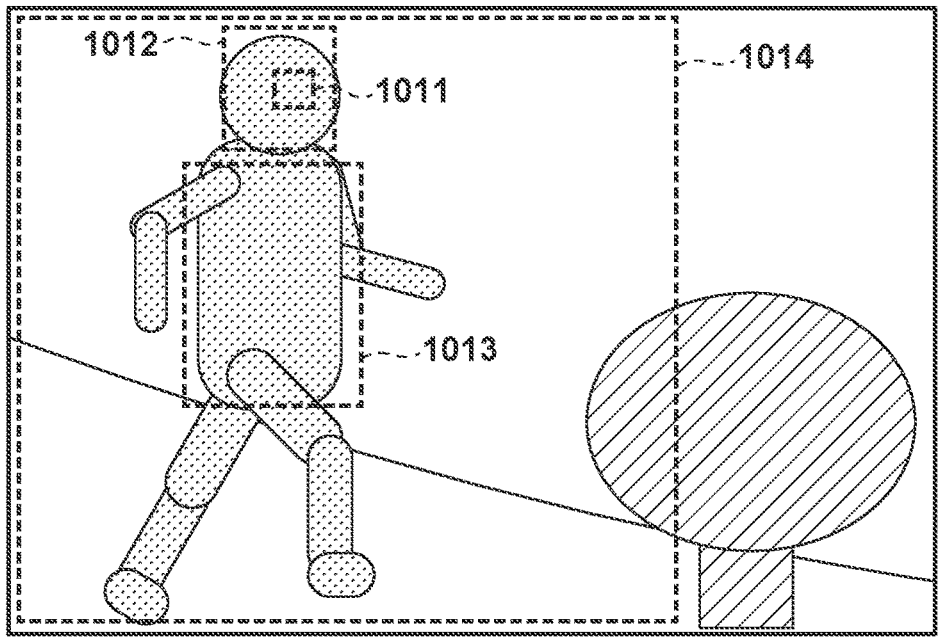
FIG. 10 is a schematic diagram showing a relationship between subjects and regions that include the subjects.

FIG. 10 is a schematic diagram showing a relationship between subjects and regions that include the subjects (hereinafter referred to as "subject regions" or "subject detection regions"). In FIG. 10, subject detection regions 1011 to 1013 have been detected. The subject detection unit 130 obtains the positions and the sizes of the respective subject detection regions 1011 to 1013. The subject detection region 1011, the subject detection region 1012, and the subject detection region 1013 correspond to the pupil, the face (head), and the torso, respectively.

In step S902, the camera MPU 125 selects a main subject from among the subjects detected in step S901. A method of selecting a main subject is determined in accordance with priority levels that are based on a preset standard. For example, a higher priority level is set for a subject detection region that is closer in position to the central image height; in the case of subject detection regions at the same position (at the same distance from the central image height), a higher priority level is set for a subject detection region of a larger size. Also, it is permissible to adopt a configuration that selects a part that a photographer often wishes to focus on in the specific type of subject (person). For example, in the case of a person, a region of a pupil may be selected as a main subject.

In step S903, the camera MPU 125 executes focus adjustment processing by controlling the phase detection AF unit 129 and the defocus range inference unit 132. The details of the focus adjustment processing will be described later with reference to FIG. 11.

In step S904, the camera MPU 125 makes a determination about focus. In a case where it has been determined that focus has been achieved, processing proceeds to step S905. In a case where it has been determined that focus has not been achieved, processing returns to step S901, and processing of steps S901 to S903 is executed with respect to the next live-view image.

In step S905, the camera MPU 125 executes shooting of an image for recording.

Details of Focus Adjustment Processing (Step S903)

Figure 11:
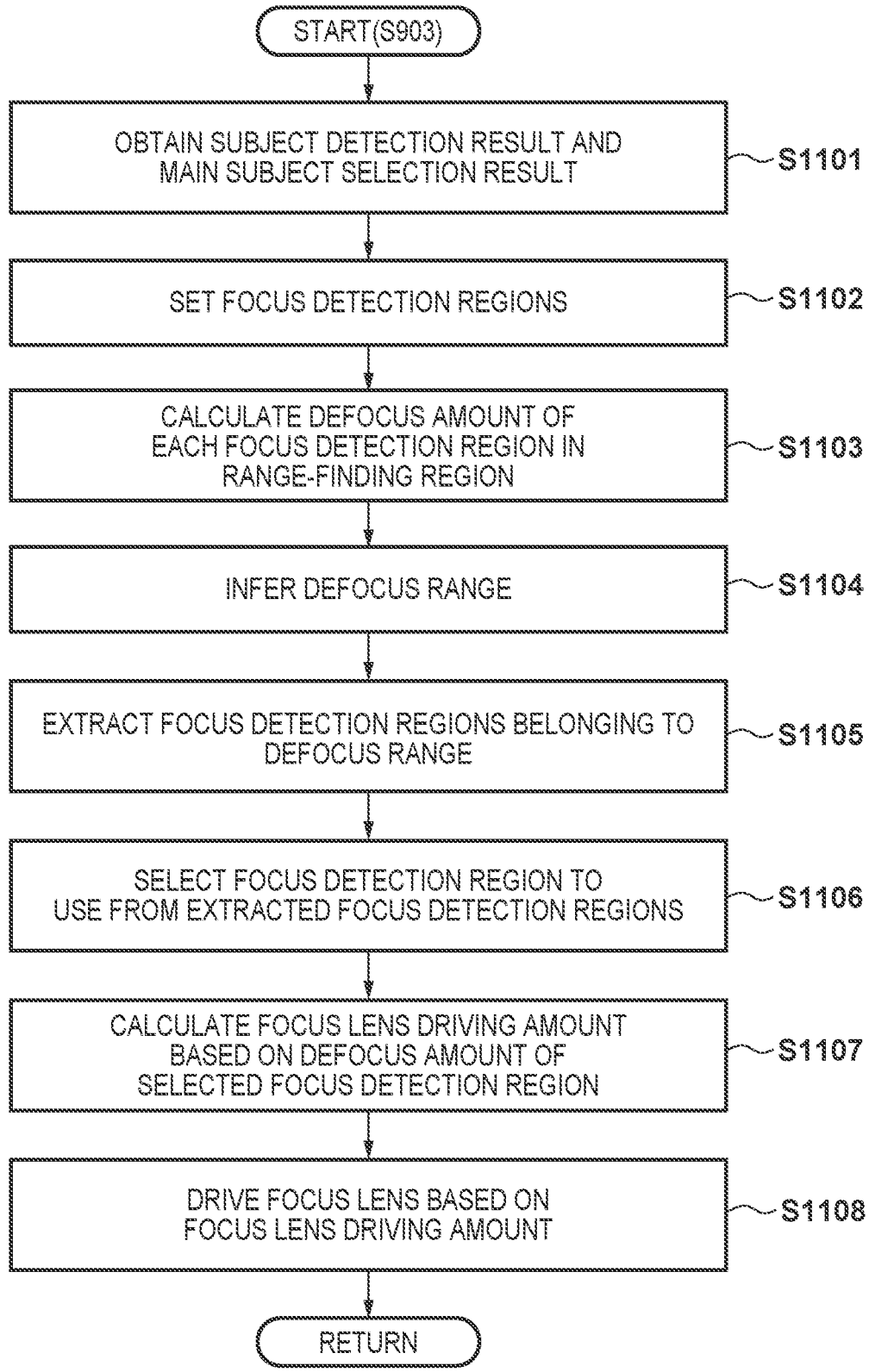
FIG. 11 is a flowchart showing the details of focus adjustment processing (step S903).

FIG. 11 is a flowchart showing the details of the focus adjustment processing (step S903). In step S1101, the phase detection AF unit 129 obtains the result of subject detection in step S901, and the result of selection of the main subject in step S902.

In step S1102, the phase detection AF unit 129 sets focus detection regions (defocus amount calculation regions).

Figure 12:
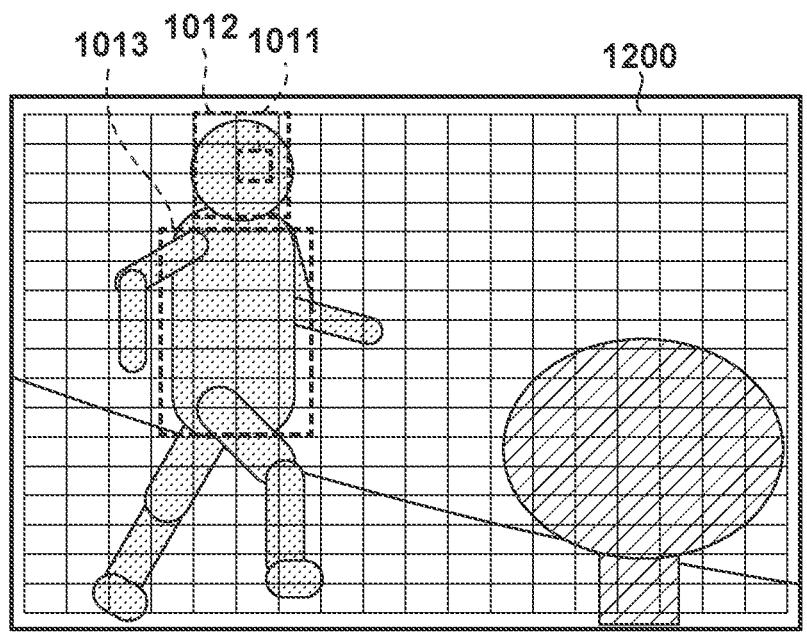
FIG. 12 is a diagram showing an example of focus detection regions set in step S1102.

FIG. 12 is a diagram showing an example of focus detection regions set in step S1102. In FIG. 12, focus detection regions 1200 are set across nearly the entire shooting range, including 18 in the horizontal direction and 17 in the vertical direction. However, a method of setting focus detection regions is not limited to the foregoing; it is sufficient to set focus detection regions in a range and at a density that have been adjusted as appropriate so as to encompass the detected subjects (subject detection regions 1011 to 1013).

In step S1103, the phase detection AF unit 129 calculates a defocus amount in each of the focus detection regions set in step S1102. In the example of FIG. 12, defocus amounts are calculated respectively in the 18 focus detection regions in the horizontal direction and the 17 focus detection regions in the vertical direction. The phase detection AF unit 129 generates a defocus map in which the calculated defocus amounts are arrayed in accordance with the positions of the corresponding focus detection regions.

Also, the phase detection AF unit 129 calculates reliabilities of the calculated defocus amounts. Generally, in correlation computation that is performed in calculation of the defocus amounts, the more the signal amount included in a spatial frequency band to be evaluated, the higher the accuracy of computation performed. Highly accurate computation can be performed with respect to, for example, high-contrast signals and signals that include many high-frequency components. In the present embodiment, the reliabilities are calculated using values that are correlated to signal amounts of signals used in focus detection, and it is considered that the more the signal amounts, the higher the reliabilities. Regarding a value that is used to calculate a reliability, it is sufficient to use, for example, the extent of change in a correlation amount at the position where the highest correlation is achieved in correlation computation, or the sum of absolute values of differences between signals neighboring the signal used in focus detection, thereas. A larger extent of change in a correlation amount, and a larger sum of absolute values, enable computation with higher accuracy, hence determination of a higher reliability. In the present embodiment, a reliability is determined to have one of three levels of magnitude: low (0), medium (1), or high (2) reliability. As one reliability value is calculated for each focus detection region, the values of reliabilities are also in a form of a map including 18 values in the horizontal direction and 17 values in the vertical direction. In the present embodiment, the plurality of reliability values arranged in a form of a map are referred to as a reliability map.

In step S1104, the defocus range inference unit 132 infers defocus ranges of the subjects. The defocus range inference unit 132 uses, as inputs for inference, the defocus map and the reliability map calculated in step S1103, image data of the subject detection regions, and the positions and the sizes of the subject detection regions. The defocus range inference unit 132 outputs the defocus ranges of the subjects as the inference result. In a case where the person shown in FIG. 10 is a subject, image data of a region 1014 that encompasses the subject detection regions 1011 to 1013 is used as the image data of the subject detection regions. With regard to the defocus map and the reliability map as well, the portion corresponding to the region 1014 is used as an input.

A defocus range of a subject is output for each of the subject detection regions (each of a plurality of layers). That is to say, two values of eye_max and eye_min are output for the subject detection region 1011 (pupil). Two values of face_max and face_min are output for the subject detection region 1012 (head). Two values of body_max and body_min are output for the subject detection region 1013 (torso). The details of the defocus range inference unit 132 will be described later.

In step S1105, the camera MPU 125 extracts focus detection regions that belong to the defocus ranges obtained in step S1104. A method of extracting focus detection regions will be described with reference to FIG. 13 and FIGS. 14A to 14C.

Figure 13:
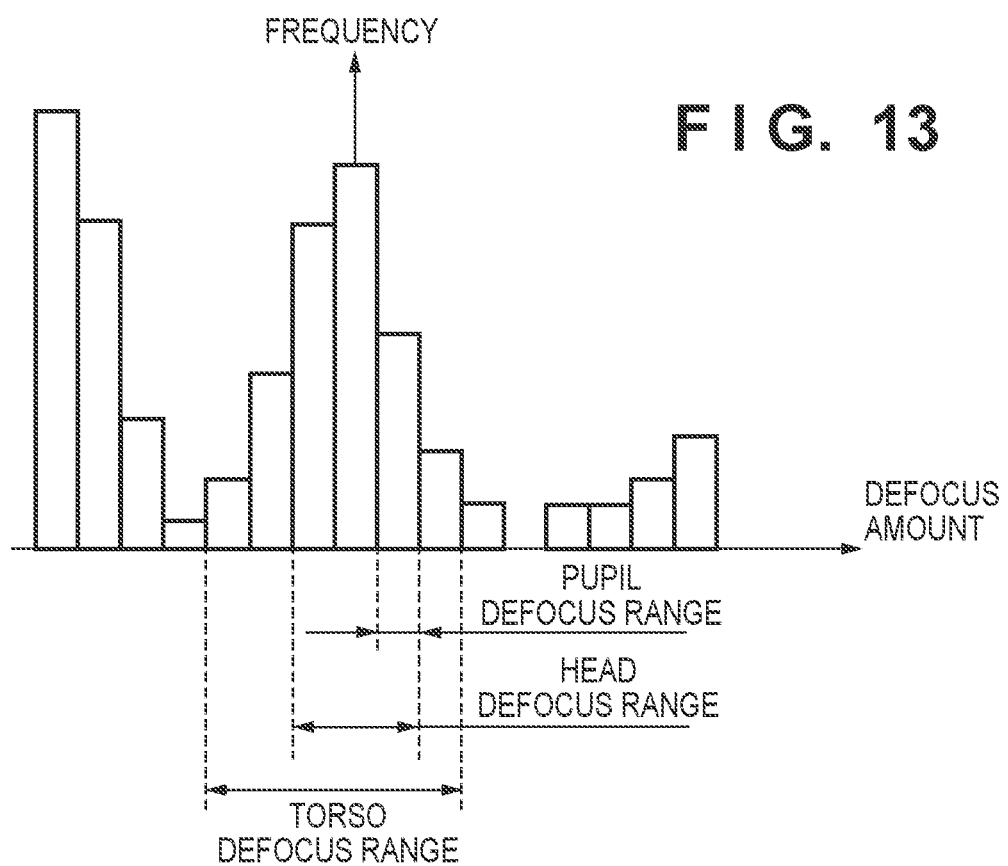
FIG. 13 is a diagram showing a histogram of defocus amounts included in a defocus map (a portion corresponding to a region 1014 of FIG. 12) that has been input at the time of inference of defocus ranges.

FIG. 13 is a diagram showing a histogram of defocus amounts included in the defocus map (the portion corresponding to the region 1014 of FIG. 10) that has been input at the time of inference of defocus ranges. In FIG. 13, a horizontal axis indicates bins that represent sections of defocus amounts, and corresponds to a subject on the nearer side as it approaches the right side. FIG. 13 indicates that the defocus amounts corresponding to the person, which is the subject, have been detected in the vicinity of a defocus amount of 0 (a vertical axis). Also, the left-side part of FIG. 13 with high frequencies indicates the frequencies of defocus amounts in a background, which is at a longer distance than the person is. On the other hand, the frequencies of the defocus amounts corresponding to a subject (a tree shown in FIG. 12) that is at a shorter distance than the person is are shown on the right side of FIG. 13.

The defocus ranges of the respective subject detection regions (the respective parts of the person) obtained in step S1104 are shown below the horizontal axis of FIG. 13. The defocus range of the torso is shown as the largest range, and the defocus range of the head and the defocus range of the pupil are shown in such a manner that they are encompassed thereby. In FIG. 13, the defocus ranges output in step S1104 are shown using levels corresponding to units of bins in the histogram; however, the present embodiment is not limited to this, and the defocus ranges may be shown using finer levels. In this case, it is also possible to generate histograms for the respective parts of the subject by determining whether each focus detection region is included in the defocus ranges of the respective parts of the subject.

Figure 14A:
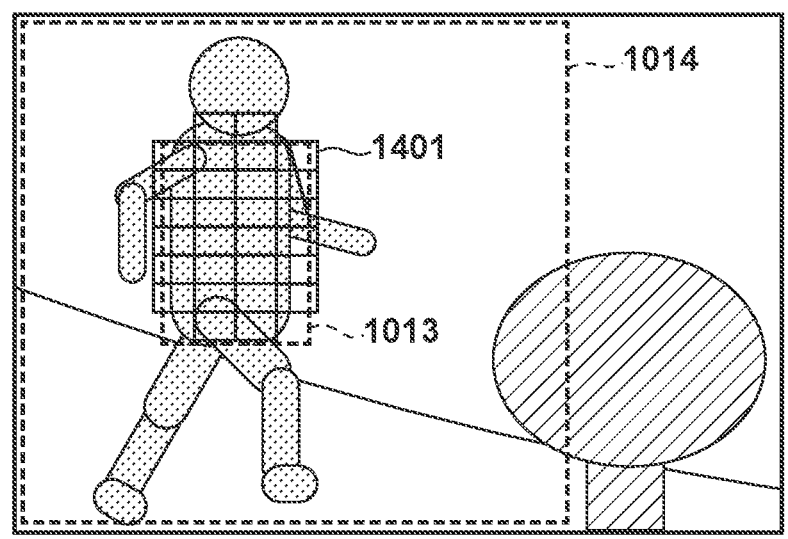
FIGS. 14A to 14C are diagrams showing focus detection regions that have been extracted based on defocus ranges of respective parts of a subject out of an input range of a defocus map (region 1014).
Figure 14B:
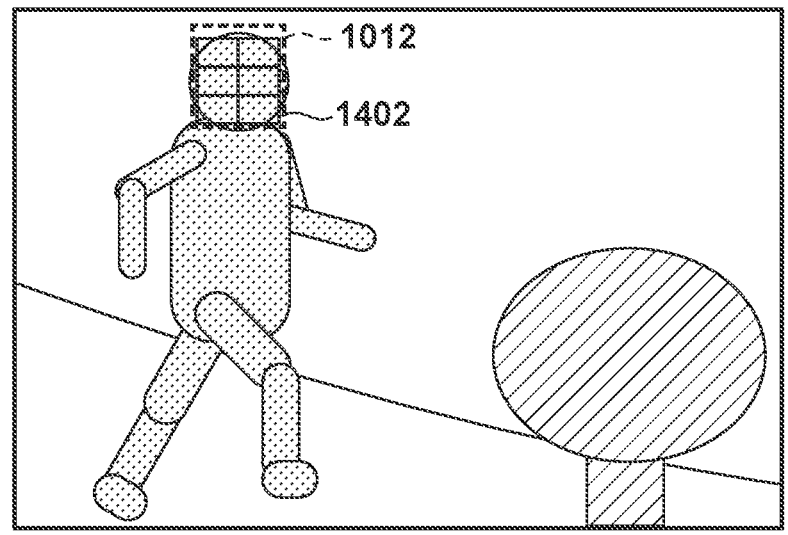
Figure 14C:
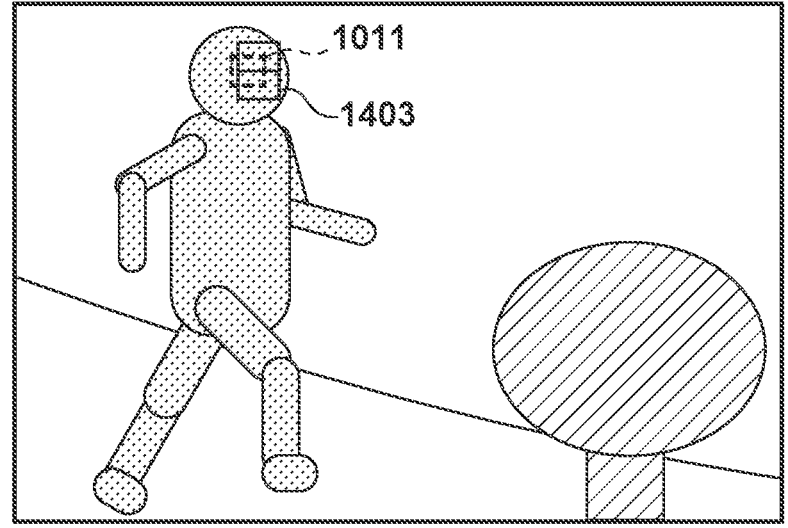

FIGS. 14A to 14C are diagrams showing focus detection regions that have been extracted based on the defocus ranges of the respective parts of the subject out of the input range of the defocus map (the region 1014). FIG. 14A shows focus detection regions 1401 that have been extracted based on the defocus range of the torso in connection with the subject detection region 1013 (the torso, a first layer). The focus detection regions 1401 roughly overlap with the subject detection region 1013 (the torso). Similarly, FIG. 14B shows focus detection regions 1402 that have been extracted based on the defocus range of the head in connection with the subject detection region 1012 (the head, a second layer). The focus detection regions 1402 roughly overlap with the subject detection region 1012 (the head). Similarly, FIG. 14C shows focus detection regions 1403 that have been extracted based on the defocus range of the pupil in connection with the subject detection region 1011 (the pupil, a third layer). The focus detection regions 1403 roughly overlap with the subject detection region 1011 (the pupil).

The defocus range inference unit 132 of the present embodiment infers the defocus ranges of the respective parts of the subject with use of later-described machine learning. In this way, the focus detection regions corresponding to the focus detection results in a background and a foreground of the subject can be eliminated, and the focus detection results (defocus amounts) with higher accuracy can be extracted as the parts of the subject.

In step S1106, the camera MPU 125 selects, from among the focus detection regions extracted in step S1105, a focus detection region to be used in driving of the focus lens, which will be performed later. The camera MPU 125 selects the focus detection region to be used from among the focus detection regions extracted in step S1105 in consideration of, for example, a high reliability, the extent of a priority degree in focusing, and closeness to a focus detection result predicted from the history of focus detection results. Regarding the extent of the priority degree in focusing, in a case where a subject is a person, it is sufficient that the priority degrees of the pupil, the head, and the torso (the first, second, and third layers) descend in this order. For example, in a case where the focus detection regions of the pupil extracted in step S1105 do not include any focus detection region with a high reliability degree, it is sufficient to make a selection from the focus detection regions of the head, which have the second highest priority degree. Here, the defocus range inference unit 132 may estimate reliability degrees based on a relationship among the defocus ranges of the plurality of parts. For example, in a case where the defocus range of the pupil of the detected subject is outside the defocus range of the head or the torso, it is considered that the inference thereof has a high possibility of being erroneous, and the corresponding reliability degrees are reduced (it is not used as the defocus range of the pupil, or the pupil are not used as a part to be brought into focus). The number of the selected focus detection region(s) is not limited in particular; it may be one, or it may be two or more. In a case where a plurality of focus detection regions are selected, the defocus amount to be ultimately used may be determined by executing processing for averaging the defocus amounts, processing for extracting a median value, or the like thereafter.

In step S1107, the phase detection AF unit 129 calculates a focus lens driving amount based on the defocus amount detected in the focus detection region selected in step S1106.

In step S1108, the phase detection AF unit 129 drives the focus lens 104 based on the focus lens driving amount calculated in step S1107.

The above-described focus adjustment processing is configured to extract focus detection regions with use of the defocus ranges of the respective parts of the subject obtained in step S1104, and then select a focus detection region to be used in driving of the focus lens. However, the present embodiment is not limited to this configuration. For example, depending on the depths and the sizes of the parts of the subject, the defocus ranges obtained in step S1104 may be sufficiently small. For example, in a case where the subject is a person, the defocus range of the pupil, which have a smaller region than the torso, is smaller than the defocus range of the torso. In such a case where the defocus ranges of the respective parts of the subject obtained in step S1104 are sufficiently small, it is permissible to calculate a focus lens driving amount by using a specific value included in a defocus range (e.g., a central value of the defocus range) as a defocus amount.

Details of Defocus Range Inference Unit 132

FIG. 15 is a diagram showing the details of the defocus range inference unit 132. An input unit 1501 integrates the image output from the image processing circuit 124, the defocus map and the reliability map output from the phase detection AF unit 129, and a subject map based on the subject detection regions output from the subject detection unit 130 as data having a plurality of channels, and inputs the data to an inference unit 1502. The input image may be an image of the entirety of the range captured by the image sensor 122, or may be an image obtained by cropping a range that encompasses the subject detection regions. The subject map is a map obtained as a result of masking in which the subject detection regions are set to a predetermined value (e.g., "1"), whereas other regions are set to another value (e.g., "0"). The reliability map is as described with reference to step S1103 of FIG. 11. Note that it is also permissible to use a binary reliability map obtained as a result of masking in which only regions with a "high" reliability are set to a predetermined value (e.g., "1"), whereas regions with a "medium" or "low" reliability are set to another value (e.g., "0"). In order to make the input sizes (resolutions) even, upsampling and downsampling are applied to the input image, defocus map, reliability map, and subject map as appropriate.

The inference unit 1502 obtains a parameter generated through machine learning, which is stored in a parameter storage unit 1504. Then, using the obtained parameter, the inference unit 1502 infers defocus ranges with respect to the data input from the input unit 1501. The inference unit 1502 outputs the defocus ranges corresponding to the parts of the subject included in the image as the inference result. An output unit 1503 associates the defocus ranges of the respective parts (torso, head, and pupil) obtained from the inference unit 1502 with metainformation, such as an ID of the image, and outputs them to the camera MPU 125. Although the present embodiment has been described using a case where a detected subject is a person, information that the inference unit 1502 obtains from the parameter storage unit 1504 may be switched in accordance with a type of a detected subject. In this case, although the cost for storing parameters increases, the inference accuracy can be improved because optimization can be performed in accordance with a type of a subject. Furthermore, subject maps may be generated respectively for the parts of the subject, or only a subject map for a specific part (e.g., torso) that acts as a representative part of the subject may be input.

In the present embodiment, the inference unit 1502 is composed of a CNN that has undergone machine learning, and infers the defocus ranges for the respective parts of the subject. The inference unit 1502 may be realized by a graphics processing unit (GPU) or a circuit dedicated to estimation processing executed by the CNN. The inference unit 1502 repeatedly executes a convolution operation in a convolutional layer and pooling in a pooling layer, as appropriate, with respect to the data input from the input unit 1501. Thereafter, the inference unit 1502 performs data reduction by executing global average pooling processing (GAP). Next, the inference unit 1502 inputs the data that has undergone the GAP processing to a multilayer perceptron (MLP). The inference unit 1502 is configured to execute processing for an arbitrary hidden layer thereafter, and then output the defocus ranges of the respective parts via an output layer.

A wide variety of models, such as a neural network that uses a CNN, a vision transformer (ViT), and a support vector machine (SVM) used in combination with a feature extraction device, can be possibly used as the inference unit 1502. Although a network format is not limited in particular, the inference unit 1502 is described to be a CNN in the description of the present embodiment.

In the present embodiment, the inference unit 1502 is configured to use the image, defocus map, reliability map, and subject map as inputs, and infers the defocus ranges. The subject map can be used to specify subject regions (subject detection regions) that include subjects out of the input image. Therefore, for example, even in a scene including an arm in front of a face of a person, which exhibits a continuous change from the defocus amounts of the face to the defocus amounts of the arm, the defocus range of the region of the face excluding the region of the arm can be extracted.

Note that although the inference unit 1502 infers a defocus range corresponding to a subject according to the above description, the inference unit 1502 may be configured to infer a defocus amount corresponding to a subject. In this case, for example, the machine learning model of the inference unit 1502 may be trained so as to infer a defocus amount which is included in the defocus range corresponding to the subject and which is located at a position that has a high possibility of being a target of focus intended by the user (e.g., the center of the defocus range).

Note that in the present embodiment, the defocus amounts included in the defocus map input to the inference unit 1502 are merely an example of distance information pieces detected from the focus detection regions. In the present embodiment, a distance information piece is not limited to a defocus amount, and may be, for example, an image displacement amount that has been described with reference to FIG. 6. Similarly, a defocus range (or a defocus amount) corresponding to a subject, which is indicated by the inference result output from the inference unit 1502, is also merely an example of a distance information range (or a distance information piece) corresponding to subject. In this regard, the same goes for a later-described inference unit 1603.

Configuration of Training Apparatus 1600

Figure 16:
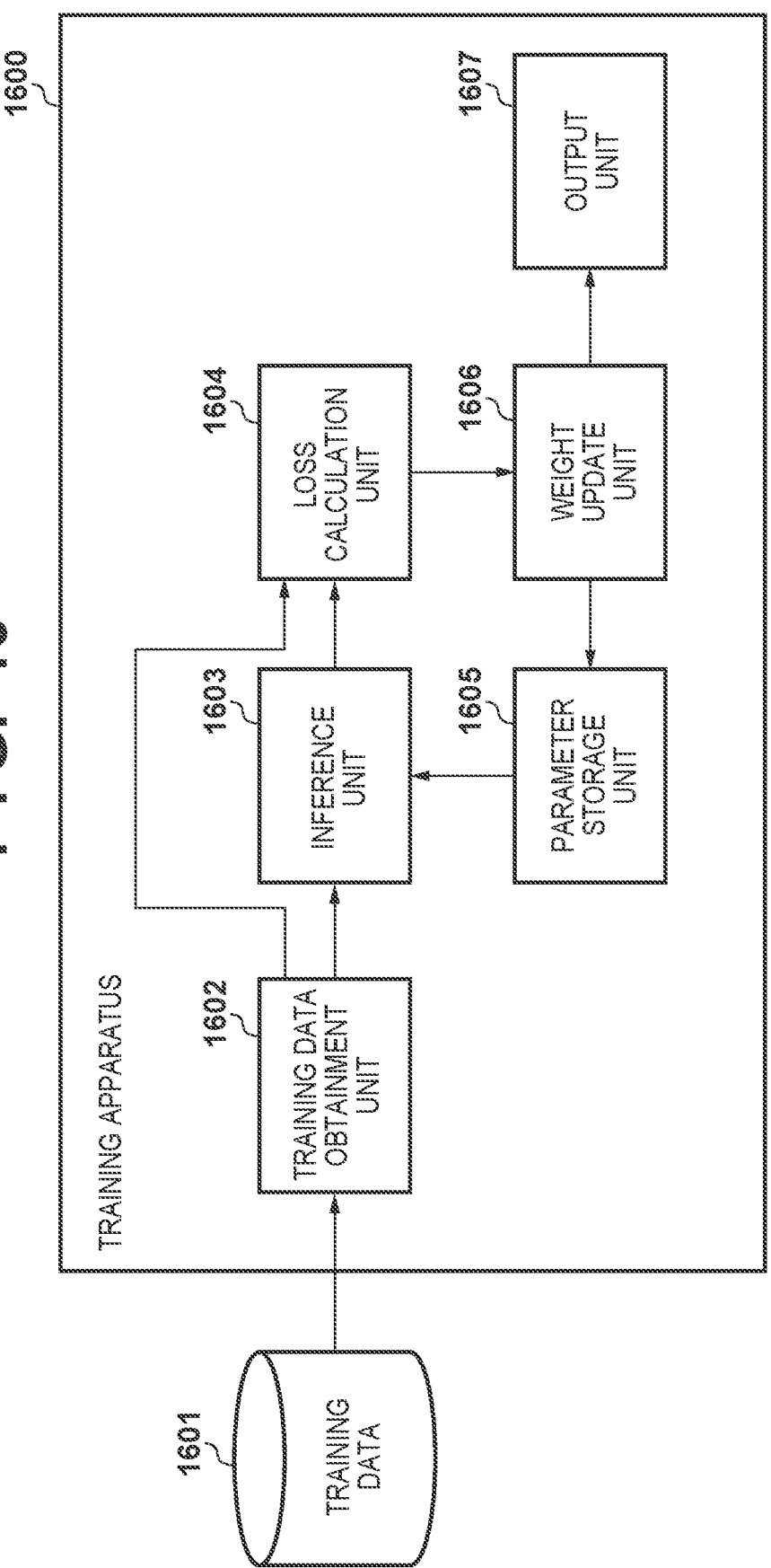
FIG. 16 is a diagram showing a configuration of a training apparatus 1600.

FIG. 16 is a diagram showing a configuration of a training apparatus 1600. The training apparatus 1600 may be an apparatus (e.g., a personal computer) different from the image capturing apparatus 10, or the image capturing apparatus 10 may have the functions of the training apparatus 1600.

The training apparatus 1600 is configured to train the inference unit 1603 using training data 1601. A training data obtainment unit 1602 obtains training data 1601 that includes a training image, a defocus map, a reliability map, a subject map, and a ground truth defocus range. The training data obtainment unit 1602 passes the training image, defocus map, reliability map, and subject map to the inference unit 1603, and passes the ground truth defocus range to a loss calculation unit 1604.

The training image, defocus map, reliability map, and subject map in the training data 1601 are generated in advance by the image capturing apparatus 10 or another image capturing apparatus. The ground truth defocus range (ground truth information) for the training image is determined, ahead of time, so as to suppress a contribution made by one or more defocus amounts that are not based on a subject among the plurality of defocus amounts included in the defocus map. For example, the ground truth defocus range (ground truth information) is determined based on defocus amounts corresponding to a region where a subject actually exists among the plurality of defocus amounts included in the defocus map. A regions where a subject actually exists (a first region) denotes a region included in a subject detection region, excluding regions of a background and an obstacle in a foreground (second regions). The task of determining the ground truth defocus range is performed by, for example, a person while they are visually checking the training image.

The inference unit 1603 has a configuration similar to that of the inference unit 1502, and infers a defocus range (or a defocus amount) corresponding to a subject included in the training image with use of a parameter obtained from a parameter storage unit 1605.

The loss calculation unit 1604 compares the inference result output from the inference unit 1603 with the ground truth defocus range passed from the training data obtainment unit 1602, and calculates a loss based on the difference therebetween. A weight update unit 1606 updates a weight (parameter) of the network used in machine learning so as to reduce the loss calculated by the loss calculation unit 1604. Thereafter, the weight update unit 1606 outputs the updated weight to an output unit 1607, and also stores the same into the parameter storage unit 1605. The weight stored in the parameter storage unit 1605 is used by the inference unit 1603 at the time of next training. By repeating the training by using a plurality of training images in sequence, the loss decreases, thereby achieving a machine learning model that can infer a defocus range (or a defocus amount) with high accuracy. The defocus range inference unit 132 infers a defocus range (or a defocus amount) using the model trained in the foregoing manner.

EXAMPLES OF ADVANTAGEOUS EFFECTS OF FIRST EMBODIMENT

Figure 17A:
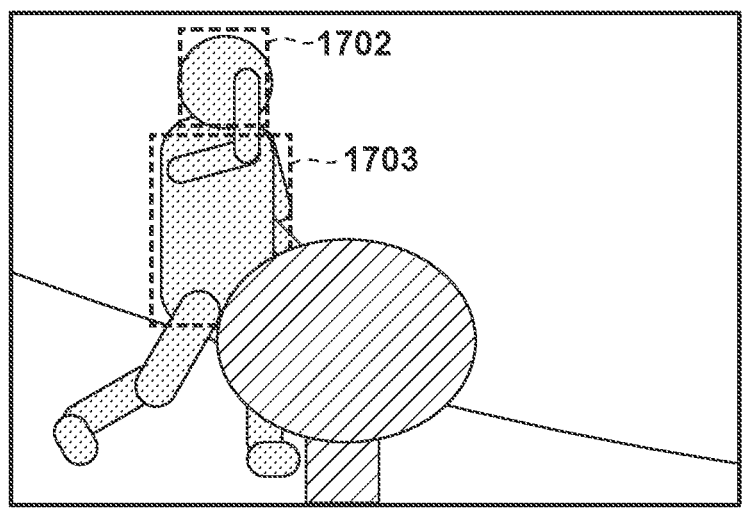
FIGS. 17A to 17C are diagrams for describing examples of advantageous effects of a first embodiment.
Figure 17B:
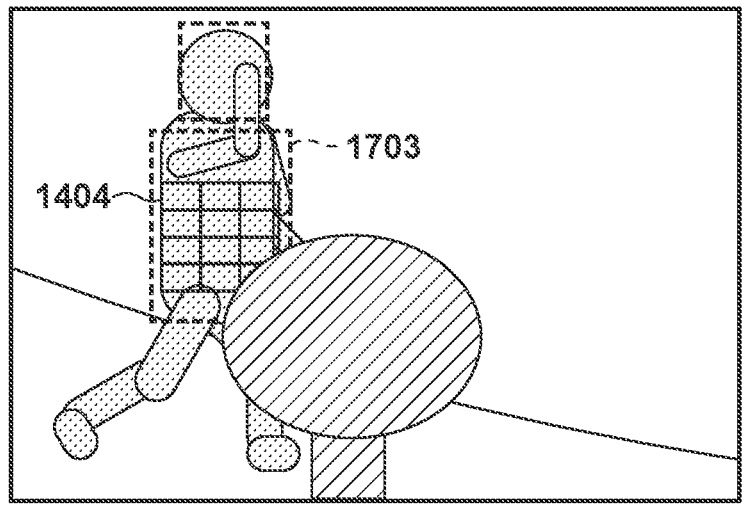
Figure 17C:
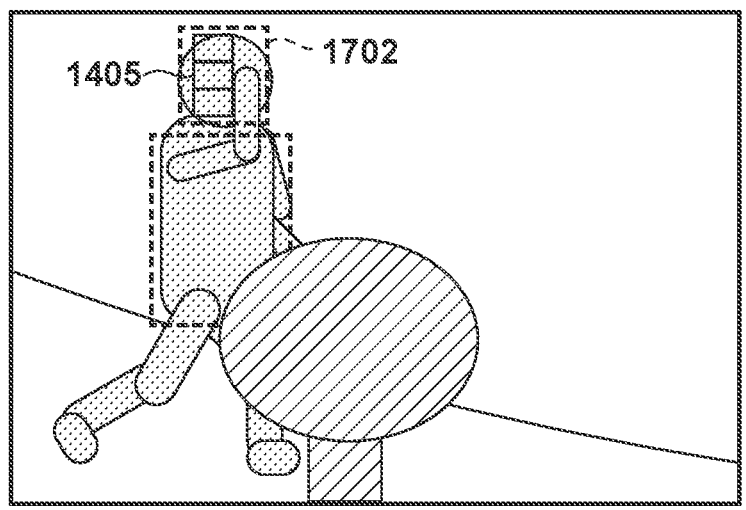

Examples of advantageous effects of the first embodiment will be described with reference to FIGS. 17A to 17C. FIGS. 17A to 17C use, as examples, images that have been shot in the same scene as FIGS. 14A to 14C, but at different timings. A tree, which is an obstacle in a foreground, overlaps with a person. As shown in FIG. 17A, although a subject detection region 1702 corresponding to a head and a subject detection region 1703 corresponding to a torso have been detected, a pupil has not been detected due to the influence of a right hand overlapping with the pupil.

FIG. 17B shows focus detection regions 1404 that have been extracted, among the focus detection regions corresponding to the subject detection region 1703 (torso), based on the defocus range obtained by the defocus range inference unit 132. In the subject detection region 1703 (torso), the defocus amounts in the focus detection regions corresponding to the region of the right arm, the region of the tree, and the region of the background are not included in the defocus range obtained through inference. Therefore, in FIG. 17B, in the subject detection region 1703 (torso), focus detection regions have not been extracted in the region of the right arm, the region of the tree, and the region of the background. As has been described earlier with reference to FIG. 16, the defocus range inference unit 132 infers a defocus range using the machine learning model that has been trained, by the training apparatus 1600, to infer the defocus range of the region where a subject actually exists (a region other than the background region and the region of an obstacle in the foreground) with high accuracy. Therefore, in step S1105 of FIG. 11, the camera MPU 125 can extract focus detection regions with highly accurate defocus amounts, which are shown in FIG. 17B. Consequently, highly accurate focus control can be performed.

Similarly, FIG. 17C shows focus detection regions 1405 that have been extracted, among the focus detection regions corresponding to the subject detection region 1702 (head), based on the defocus range obtained by the defocus range inference unit 132. In the subject detection region 1702 (head), the defocus amounts in the focus detection regions corresponding to the region of the right arm and the region of the background are not included in the defocus range obtained through inference. Therefore, in FIG. 17C, in the subject detection region 1702 (head), focus detection regions have not been extracted in the region of the right arm and the region of the background. In this way, the advantageous effects similar to those described with reference to FIG. 17B can be achieved also with respect to the subject detection region 1702 (head).

Note that according to the above description, the ground truth defocus range is determined so as to include the defocus amounts of a region where a subject actually exists (a region other than the background region and the region of an obstacle in the foreground among the subject detection region). However, the present embodiment is also applicable to a case where defocus amounts that are not correct as a subject (defocus amounts that are not based on the subject) are detected for reasons other than reasons related to a background and an obstacle. For example, in a case where a focus detection accuracy is low and significant variations occur when focus detection is performed repeatedly, the focus detection results may vary even in a region where a subject actually exists. In such a case, similar advantageous effects can be achieved by defining the ground truth defocus range so as not to include outliers of defocus amounts associated with the variations (defocus amounts (distance information pieces) with a detection error exceeding a predetermined extent) (so as to suppress a contribution made by the outliers). With this method, a defocus range can be obtained with high accuracy also in a case where the diaphragm value of the shooting optical system with which the focus detection accuracy is degraded is large, in a case where a subject is at a large image height, in a case where a subject exhibits low contrast, and so forth. Similarly, also in a case where defocus amounts that have been influenced by snow or rain have been detected inside a subject detection region, the ground truth defocus range can be defined by excluding such defocus amounts. This enables highly accurate inference of defocus ranges of subjects irrespective of weather.

When focus control is carried out while performing focus detection, known prediction AF processing may be executed. This is intended to perform focus control by predicting a focusing position at a timing of image capturing performed by the image capturing apparatus with use of a past history of focus detection results. By using highly accurate defocus ranges obtained by the defocus range inference unit 132 at the time of execution of the prediction AF processing, the use of erroneous defocus amounts can be suppressed. This suppresses the execution of excessive focus control or a delay in focus control under the actual state of movement of a subject; as a result, highly accurate focus control can be performed.

First Modification Example

Figure 18A:
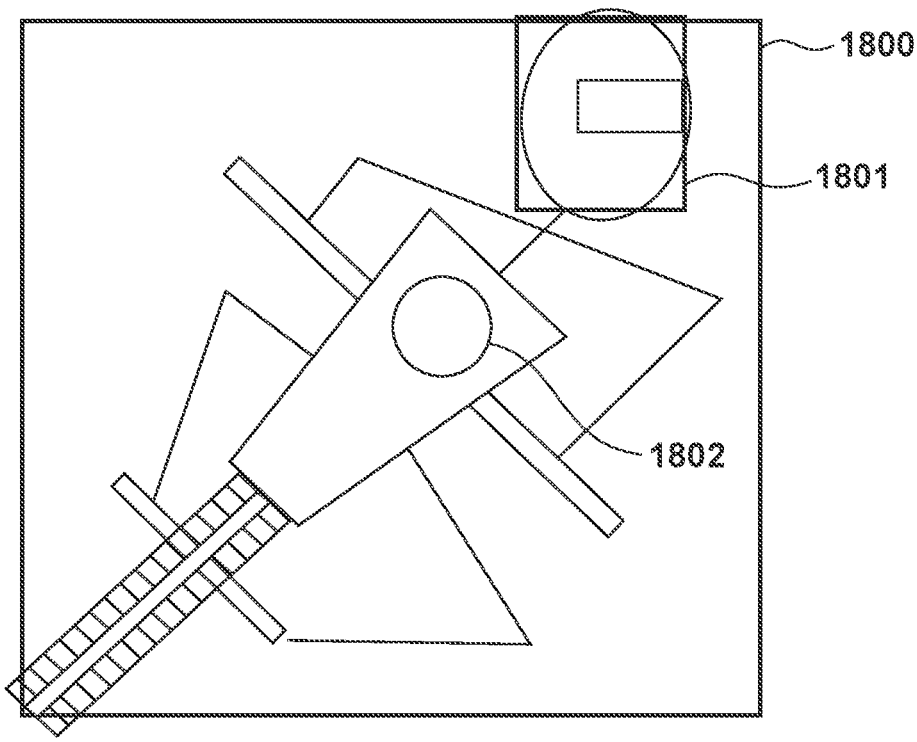
FIGS. 18A and 18B are diagrams for describing a first modification example of a method of using a defocus range inferred by the defocus range inference unit 132.
Figure 18B:
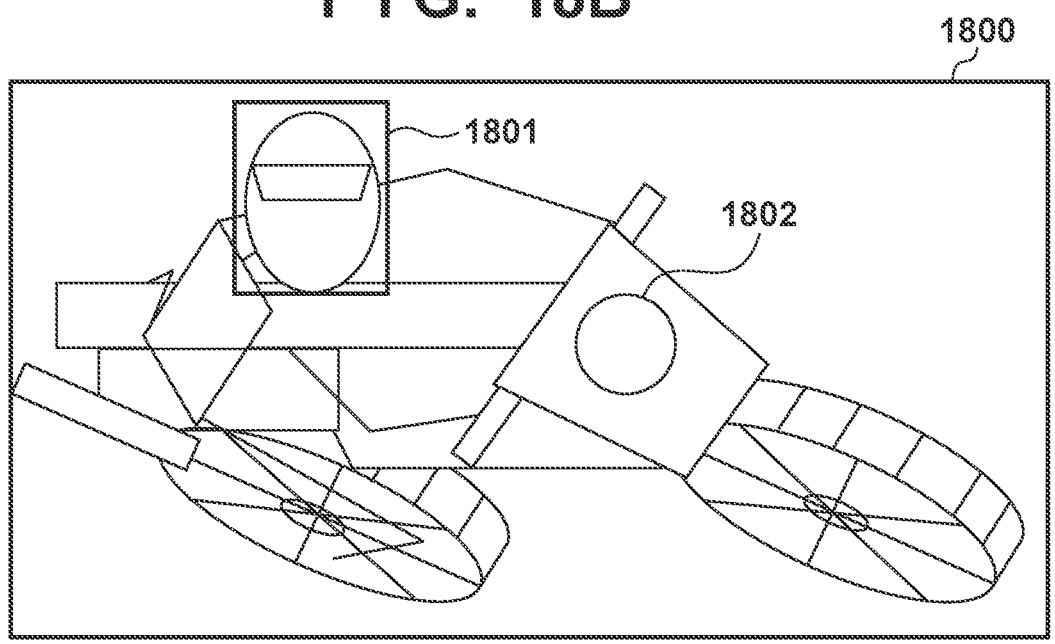
Figure 19:
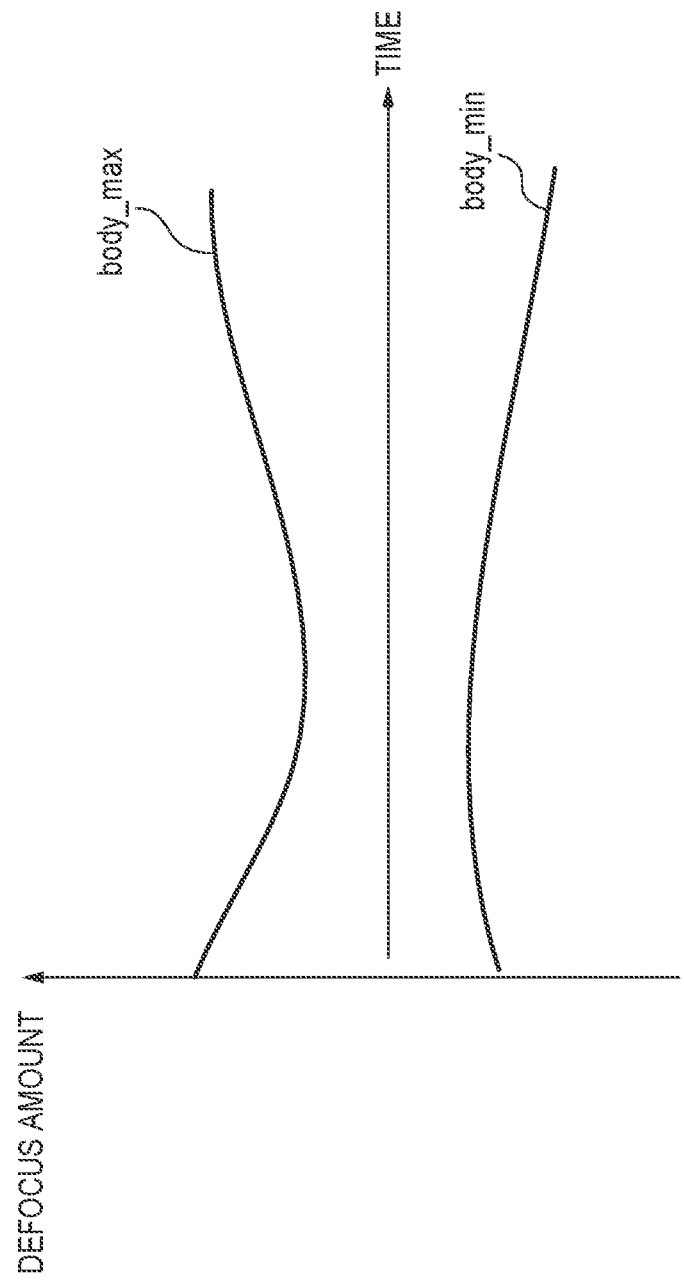
FIG. 19 is a diagram for describing the first modification example of the method of using a defocus range inferred by the defocus range inference unit 132.

With reference to FIGS. 18A and 18B and FIG. 19, the following describes a first modification example of a method of using a defocus range inferred by the defocus range inference unit 132. FIGS. 18A and 18B show various scenes for shooting of a two-wheeled vehicle under the assumption that a vehicle (two-wheeled vehicle) is to be shot as a subject. FIG. 18A shows a scene for shooting from the front, whereas FIG. 18B shows a scene for shooting from the right front side. In FIGS. 18A and 18B, a head 1801 and an entire vehicle body 1800 are shown as subjects to be detected, or detection regions. As described above, subject detection can be realized by using data for a vehicle as dictionary data.

In such scenes for shooting, in a case where a photographer wishes to obtain an image in which a head of a subject is focused on, the image in which the head is focused on with high accuracy can be obtained by performing focus control with a selection of a defocus amount with use of a defocus range for the head, as stated earlier.

Meanwhile, there is also a case where a mark portion 1802 at the front of the two-wheeled vehicle is desired to be focused on. FIG. 19 shows a defocus range output by the defocus range inference unit 132, which changes with time, in the scenes for shooting pertaining to the examples shown in FIGS. 18A and 18B. In FIG. 19, a maximum value body_max of the defocus range and a minimum value body_min of the defocus range are shown in a graph with respect to the subject detection result for the entire vehicle body. In the present embodiment, regarding the positive and negative states of a defocus amount, it is assumed that the positive state indicates a defocus state on the far side and the negative state indicates a defocus state on the near side, relative to an in-focus region. A horizontal axis indicates time, whereas a vertical axis indicates defocus amounts. It is considered that an appropriate defocus amount is to be derived from the inferred defocus range in order to focus on the mark portion 1802 of the vehicle body in the states shown in FIGS. 18A and 18B and FIG. 19. For example, in a case where a position that is desired to be constantly brought into focus is on the near side of the photographer, it is sufficient to perform focus control with use of a defocus amount of the nearest side indicated by the defocus range. In a case where a two-wheeled vehicle is to be shot as shown in FIGS. 18A and 18B, as a front wheel portion is the nearest, it is possible to use a method whereby focus control is performed with use of defocus amounts that account for 20% of the defocus range on the near side. Such defocus amounts can be calculated by the following computation: 0.8×body_min+0.2×body_max.

Furthermore, it is also possible to allow the photographer to input a position that is desired to be brought into focus inside the defocus range. This allows the photographer to configure settings based on the depth of field in accordance with, for example, the distance to the subject to be shot.

Second Modification Example

The following describes a modification example in which a diaphragm is controlled (adjusted) as a second modification example of a method of using a defocus range inferred by the defocus range inference unit 132. It is possible to perform diaphragm control in the AE unit 131 by taking advantage of the fact that defocus ranges can be inferred for respective parts of a subject. The diaphragm control enables not only adjustment of the amount of light, but also adjustment of the depth of field. The diaphragm can be adjusted to control the extent to which a subject included in a desired subject detection region is included in the depth of field with use of information of a defocus range of the subject. For example, a state where the entirety of the subject inside the subject detection region is in focus can be realized by adjusting the diaphragm so that the defocus range of the subject falls in a unit depth determined from the permissible circle of confusion.

Furthermore, in the present embodiment, diaphragm control that is more suited for the intention of the photographer can be performed by taking advantage of the fact that defocus ranges are output for respective parts of a subject. For instance, in the examples of FIGS. 18A and 18B, diaphragm control that places the near-side ranges of the head and the vehicle body into an in-focus state can be performed. This can be realized by controlling the diaphragm so that head_max of the defocus range for the head through to body_min of the defocus range for the entire vehicle body are included in the depth of field.

Third Modification Example

The following describes a modification example in which defocus ranges of a subject are displayed as a third modification example of a method of using a defocus range inferred by the defocus range inference unit 132. FIGS. 14A to 14C show focus detection regions that are included in the defocus ranges corresponding to the detection regions of respective parts of a subject as frames of the focus detection regions 1401 and the focus detection regions 1402 (information for giving notice of focus detection regions). While they indicate the focus detection regions that have been extracted using the output of the defocus range inference unit 132, they may be displayed on the display unit 126 so as to inform the photographer of the extracted focus detection regions 1401 and focus detection regions 1402.

By using the inference result from the defocus range inference unit 132, defocus ranges can be displayed, together with the regions of the detected subject, when displaying a live-view display that is currently shot or an image that has been shot. At the time of display, defocus amounts may be converted on a color scale, and the magnitudes of the defocus amounts may be displayed in the form of color differences. This allows the photographer to visually confirm a focus state of an intended subject detection region. Furthermore, the photographer can visually confirm that the focus detection results have not been influenced by a background or a foreground, thereby allowing shooting to be performed in a focus state that matches the intention of the photographer.

Summary of First Embodiment

As described above, according to the first embodiment, the image capturing apparatus 10 performs inference with use of a machine learning model based on a subject region including a subject (e.g., a head of a person) within an image obtained through shooting, and on a plurality of distance information pieces (e.g., a defocus map) detected from a plurality of focus detection regions inside the subject region, thereby generating an inference result indicating a distance information piece (e.g., a defocus amount) corresponding to the subject or a distance information range (e.g., a defocus amount range) corresponding to the subject. The machine learning model is a model that has been trained to suppress a contribution made to the inference result by one or more distance information pieces that are not based on the subject among the plurality of distance information pieces. The one or more distance information pieces that are not based on the subject are, for example, one or more distance information pieces corresponding to one or more focus detection regions corresponding to a region where the subject does not exist within the subject region, one or more distance information pieces with a detection error that exceeds a predetermined extent, and so forth.

Furthermore, according to the first embodiment, the training apparatus 1600 performs inference with use of a machine learning model based on a subject region including a subject within an image obtained through shooting, and on a plurality of distance information pieces detected from a plurality of focus detection regions inside the subject region, thereby generating an inference result indicating a distance information piece corresponding to the subject or a distance information range corresponding to the subject. Also, the training apparatus 1600 trains the machine learning model so that the inference result approaches ground truth information to which a contribution made by one or more distance information pieces that are not based on the subject among the plurality of distance information pieces is suppressed.

Therefore, according to the first embodiment, when using a plurality of distance information pieces that have been detected from a plurality of focus detection regions inside a subject region, a contribution made by a distance information piece(s) that is not based on the subject can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-024624, filed Feb. 20, 2023, which is hereby incorporated by reference herein in its entirety.

What is claimed is:

1. An image capturing apparatus comprising at least one processor and/or at least one circuit which functions as:
    an image capturing unit configured to generate an image through shooting;
    a first detection unit configured to detect a subject region from the image;
    a second detection unit configured to detect a plurality of distance information pieces from a plurality of focus detection regions inside the subject region; and
    an inference unit configured to perform inference with use of a machine learning model based on the subject region including a subject within the image obtained through shooting, and on the plurality of distance information pieces detected from the plurality of focus detection regions inside the subject region, thereby generating an inference result indicating a distance information piece corresponding to the subject or a distance information range corresponding to the subject,
    wherein the machine learning model is a model that has been trained to suppress a contribution made to the inference result by one or more distance information pieces that are not based on the subject among the plurality of distance information pieces.

2. The image capturing apparatus according to claim 1, wherein
    the subject region includes a first region where the subject exists, and a second region where the subject does not exist, and
    the one or more distance information pieces that are not based on the subject among the plurality of distance information pieces include one or more distance information pieces corresponding to one or more focus detection regions corresponding to the second region among the plurality of focus detection regions.

3. The image capturing apparatus according to claim 1, wherein
    the one or more distance information pieces that are not based on the subject among the plurality of distance information pieces include one or more distance information pieces with a detection error that exceeds a predetermined extent among the plurality of distance information pieces.

4. The image capturing apparatus according to claim 1, wherein the at least one processor and/or the at least one circuit further functions as
a first adjustment unit configured to adjust a focus of an optical system used in the shooting based on the inference result.

5. The image capturing apparatus according to claim 4, wherein
the inference result indicates the distance information range corresponding to the subject, and
the first adjustment unit adjusts the focus of the optical system based on a distance information piece that is included in the distance information range among the plurality of distance information pieces.

6. The image capturing apparatus according to claim 1, wherein
the inference result indicates the distance information range corresponding to the subject, and
the at least one processor and/or the at least one circuit further functions as
a second adjustment unit configured to adjust a diaphragm of an optical system used in the shooting based on the distance information range.

7. The image capturing apparatus according to claim 6, wherein
the second adjustment unit adjusts the diaphragm of the optical system based on the distance information range so that the subject is included in a depth of field.

8. The image capturing apparatus according to claim 1, wherein
the inference result indicates the distance information range corresponding to the subject, and
the at least one processor and/or the at least one circuit further functions as
a display unit configured to display information for giving notice of a focus detection region corresponding to a distance information piece that is included in the distance information range among the plurality of distance information pieces.

9. The image capturing apparatus according to claim 1, wherein
the plurality of distance information pieces detected from the plurality of focus detection regions are a plurality of defocus amounts detected from the plurality of focus detection regions.

10. The image capturing apparatus according to claim 9, wherein
the inference result indicates a defocus amount corresponding to the subject or a defocus amount range corresponding to the subject.

11. The image capturing apparatus according to claim 1, wherein
the first detection unit detects a plurality of subject regions each of which partially includes each of a plurality of subjects,
the second detection unit detects a plurality of distance information pieces for each of the plurality of subject regions, and
the inference unit generates an inference result for each of the plurality of subjects.

12. The image capturing apparatus according to claim 11, wherein
the plurality of subjects correspond to a plurality of parts of a subject of a predetermined type.

13. An inference apparatus comprising at least one processor and/or at least one circuit which functions as:
an image capturing unit configured to generate an image through shooting;
an obtainment unit configured to obtain the image obtained through shooting, information of a subject region including a subject within the image, and a plurality of distance information pieces that respectively correspond to a plurality of regions inside the subject region; and
an inference unit configured to perform inference with use of a machine learning model using, as inputs, the image, the information of the subject region, and the plurality of distance information pieces, thereby generating an inference result indicating a distance information piece corresponding to the subject or a distance information range corresponding to the subject.

14. The inference apparatus according to claim 13, wherein
the obtainment unit obtains a plurality of distance information pieces corresponding to a plurality of parts of the subject, and
the inference unit generates an inference result indicating a plurality of distance information ranges corresponding to the plurality of parts.

15. An image capturing apparatus, comprising:
the inference apparatus according to claim 14,
wherein the at least one processor and/or the at least one circuit further functions as:
a determination unit configured to, based on priority degrees of the plurality of parts, determine a part to be focused on from the plurality of distance information ranges corresponding to the plurality of parts output from the inference apparatus.

16. The image capturing apparatus according to claim 15, wherein
the determination unit compares the plurality of distance information ranges corresponding to the plurality of parts with one another, thereby determining the part to be focused on from the plurality of distance information ranges.

17. A training apparatus comprising at least one processor and/or at least one circuit which functions as:
an image capturing unit configured to generate an image through shooting;
a first detection unit configured to detect a subject region from the image; and
a second detection unit configured to detect a plurality of distance information pieces from a plurality of focus detection regions inside the subject region;
an inference unit configured to perform inference with use of a machine learning model based on the subject region including a subject within the image obtained through shooting, and on the plurality of distance information pieces detected from the plurality of focus detection regions inside the subject region, thereby generating an inference result indicating a distance information piece corresponding to the subject or a distance information range corresponding to the subject; and
a training unit configured to train the machine learning model so that the inference result approaches ground truth information to which a contribution made by one or more distance information pieces that are not based on the subject among the plurality of distance information pieces is suppressed.

18. An inference method executed by an inference apparatus, comprising:
generating an image through shooting;

detecting a subject region from the image;

detecting a plurality of distance information pieces from a plurality of focus detection regions inside the subject region; and performing inference with use of a machine learning model based on the subject region including a subject within the image obtained through shooting, and on the plurality of distance information pieces detected from the plurality of focus detection regions inside the subject region, thereby generating an inference result indicating a distance information piece corresponding to the subject or a distance information range corresponding to the subject, wherein the machine learning model is a model that has been trained to suppress a contribution made to the inference result by one or more distance information pieces that are not based on the subject among the plurality of distance information pieces.

19. A training method executed by a training apparatus, comprising:

generating an image through shooting;

detecting a subject region from the image;

detecting a plurality of distance information pieces from a plurality of focus detection regions inside the subject region;

performing inference with use of a machine learning model based on the subject region including a subject within the image obtained through shooting, and on the plurality of distance information pieces detected from the plurality of focus detection regions inside the subject region, thereby generating an inference result indicating a distance information piece corresponding to the subject or a distance information range corresponding to the subject; and training the machine learning model so that the inference result approaches ground truth information to which a contribution made by one or more distance information pieces that are not based on the subject among the plurality of distance information pieces is suppressed.

20. A non-transitory computer-readable storage medium which stores a program for causing a computer to execute an inference method comprising:

generating an image through shooting;

detecting a subject region from the image;

detecting a plurality of distance information pieces from a plurality of focus detection regions inside the subject region;

performing inference with use of a machine learning model based on the subject region including a subject within the image obtained through shooting, and on the plurality of distance information pieces detected from the plurality of focus detection regions inside the subject region, thereby generating an inference result indicating a distance information piece corresponding to the subject or a distance information range corresponding to the subject, wherein the machine learning model is a model that has been trained to suppress a contribution made to the inference result by one or more distance information pieces that are not based on the subject among the plurality of distance information pieces.

21. A non-transitory computer-readable storage medium which stores a program for causing a computer to execute a training method comprising:

generating an image through shooting;

detecting a subject region from the image;

detecting a plurality of distance information pieces from a plurality of focus detection regions inside the subject region;

performing inference with use of a machine learning model based on the subject region including a subject within the image obtained through shooting, and on the plurality of distance information pieces detected from the plurality of focus detection regions inside the subject region, thereby generating an inference result indicating a distance information piece corresponding to the subject or a distance information range corresponding to the subject; and training the machine learning model so that the inference result approaches ground truth information to which a contribution made by one or more distance information pieces that are not based on the subject among the plurality of distance information pieces is suppressed.

\* \* \* \* \*